(12) United States Patent
Papafagos

(10) Patent No.: US 10,428,982 B2
(45) Date of Patent: Oct. 1, 2019

(54) GRIP AND FITTING ASSEMBLIES AND KITS UTILIZING THE SAME

(71) Applicant: Tectran Mfg. Inc., Cheektowaga, NY (US)

(72) Inventor: James C. Papafagos, North Java, NY (US)

(73) Assignee: TECTRAN MFG. INC., Cheektowaga, NY (US)

( * ) Notice: Subject to any disclaimer, the term of this patent is extended or adjusted under 35 U.S.C. 154(b) by 134 days.

(21) Appl. No.: 15/683,455

(22) Filed: Aug. 22, 2017

(65) Prior Publication Data

US 2018/0038527 A1  Feb. 8, 2018

Related U.S. Application Data

(63) Continuation of application No. 15/416,755, filed on Jan. 26, 2017, now Pat. No. 9,759,359.

(60) Provisional application No. 62/287,420, filed on Jan. 26, 2016.

(51) Int. Cl.
| | |
|---|---|
| *F16B 7/04* | (2006.01) |
| *F16L 21/02* | (2006.01) |
| *F16L 21/08* | (2006.01) |
| *F16L 33/22* | (2006.01) |
| *F16L 19/02* | (2006.01) |

(52) U.S. Cl.
CPC ............ *F16L 21/08* (2013.01); *F16B 7/0413* (2013.01); *F16L 19/02* (2013.01); *F16L 21/02* (2013.01); *F16L 33/22* (2013.01); *Y10T 403/7015* (2015.01)

(58) Field of Classification Search
CPC .. F16B 7/0413; F16B 7/20; F16B 7/22; F16L 21/02; F16L 21/08; F16L 33/22; F16L 33/222; F16L 35/00; F16L 37/107; F16L 37/113; F16L 37/248; F16L 37/252; Y10T 403/7005; Y10T 403/7007; Y10T 403/7015; Y10T 403/7031; Y10T 403/7073
USPC ..................... 403/348, 349, 353, 359.3, 375; 285/114–116, 247–251
See application file for complete search history.

(56) References Cited

U.S. PATENT DOCUMENTS

| | | | | |
|---|---|---|---|---|
| 2,111,859 | A | * | 3/1938 | Kennedy ............... F16L 37/252 285/110 |
| 2,922,667 | A | * | 1/1960 | Lanciano, Jr. ........ F16L 37/252 285/260 |
| 3,367,681 | A | * | 2/1968 | Braukman .......... F16L 27/0816 285/148.13 |

(Continued)

FOREIGN PATENT DOCUMENTS

GB    982221 A * 2/1965 .......... F16L 37/0848

*Primary Examiner* — Josh Skroupa
(74) *Attorney, Agent, or Firm* — Verrill Dana, LLP; John W. Powell

(57) ABSTRACT

A grip and fitting assembly for coupling an air hose to a gladhand coupler. The grip is flexible and tapered with a tubular interior through which may pass a length of hose shielded and protected by the grip. The grip is affixed to a fitting attachable to the gladhand coupler on a first threaded end thereof and attachable to the air hose on a second barbed end thereof. The grip is configured with one or more internal keyway boss which aligns and interlocks with one or more corresponding keyway recess on a retaining shoulder formed between the ends of the fitting.

34 Claims, 16 Drawing Sheets

(56) References Cited

U.S. PATENT DOCUMENTS

| | | | | |
|---|---|---|---|---|
| 5,104,157 A * | 4/1992 | Bahner | ............... | F16L 37/084 285/307 |
| 5,443,289 A * | 8/1995 | Guest | ............... | F16L 37/092 285/308 |
| 6,217,082 B1 * | 4/2001 | Orcutt | ............... | F16L 27/08 285/258 |
| 6,779,269 B2 * | 8/2004 | Green | ............... | F16L 35/00 285/114 |
| 7,014,215 B2 * | 3/2006 | Cooper | ............... | F16L 19/0231 285/247 |
| 7,052,046 B2 * | 5/2006 | Caldwell | ............... | B60D 1/62 285/45 |
| 7,832,775 B2 * | 11/2010 | Regener | ............... | F02B 33/44 285/377 |
| 8,162,354 B2 * | 4/2012 | Takizawa | ............... | B60T 17/043 285/137.11 |
| 2006/0226651 A1 * | 10/2006 | Griswold | ............... | F16L 37/0925 285/322 |
| 2008/0185842 A1 * | 8/2008 | Blackman | ............... | F16L 15/006 285/376 |
| 2015/0219259 A1 * | 8/2015 | Weems | ............... | F16L 33/30 285/272 |

\* cited by examiner

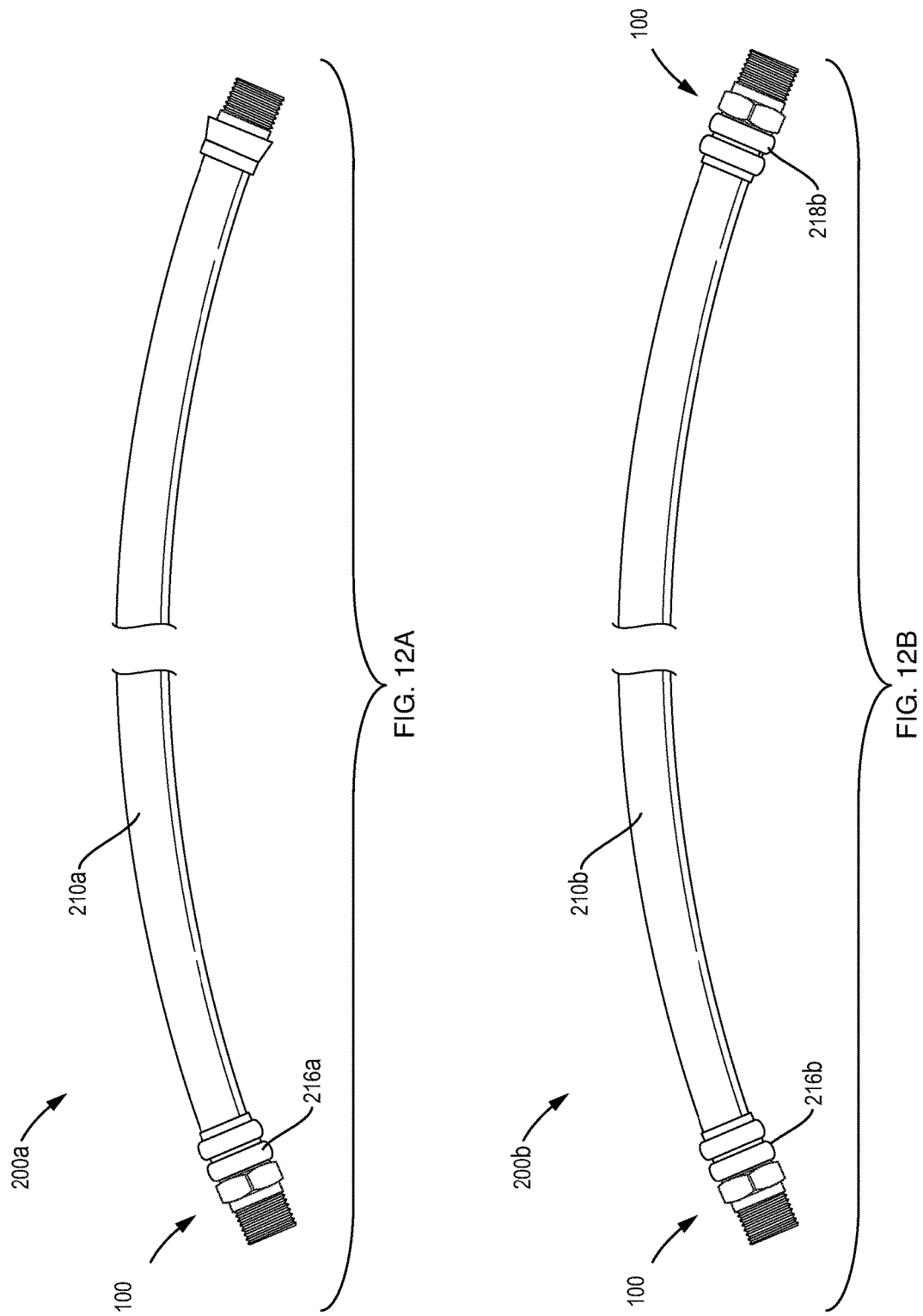

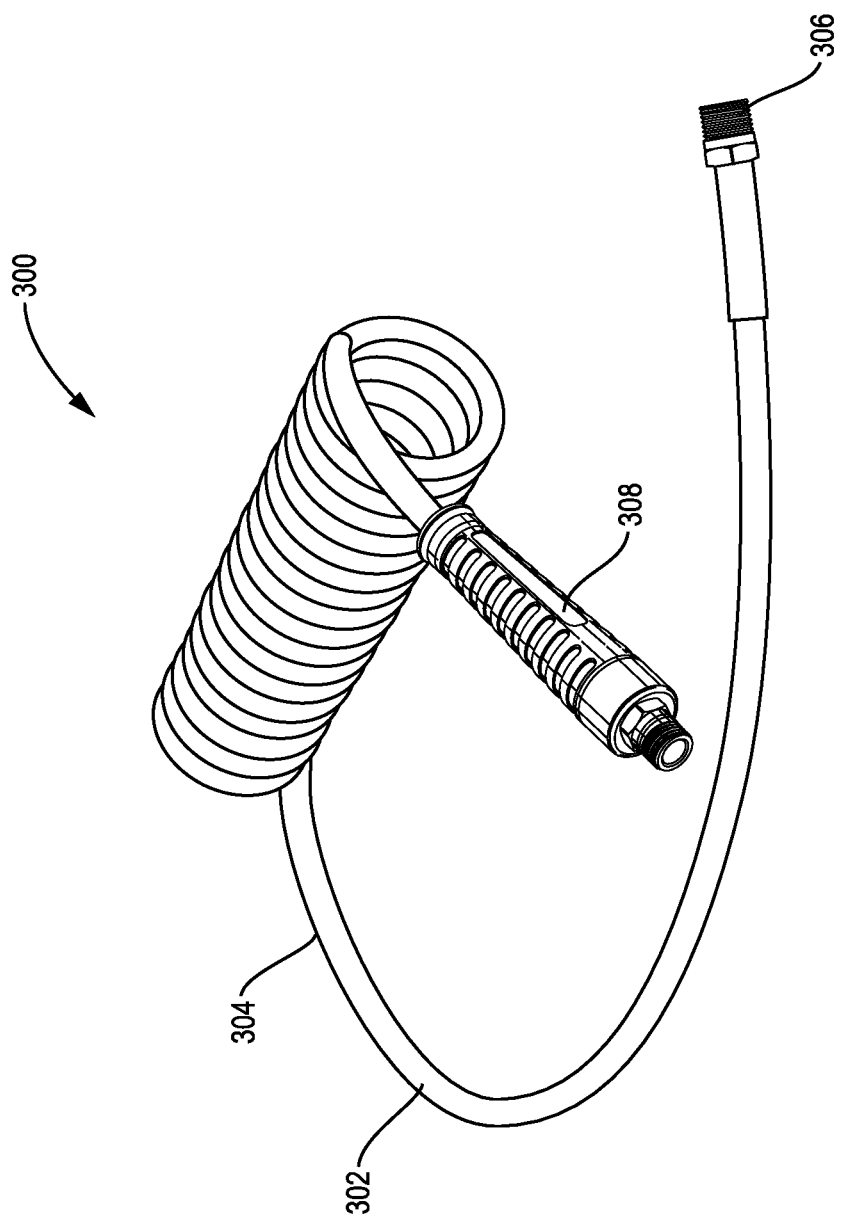

GRIP AND FITTING ASSEMBLIES AND KITS UTILIZING THE SAME

CROSS REFERENCE TO RELATED APPLICATIONS

This application is a continuation of U.S. patent application Ser. No. 15/416,755 filed Jan. 26, 2017, which is a continuation-in-part of U.S. patent application Ser. No. 15/233,006 filed Aug. 10, 2016, which claims the benefit of priority to U.S. Provisional Patent Application Ser. No. 62/287,420 filed Jan. 26, 2016, all of which are incorporated by reference herein in their entirety.

FIELD OF THE INVENTION

The invention described herein relates generally to the field of grip fitting assemblies for tube and hose connections. More specifically, the present invention provides improved operation, installation, durability, weather-resistance, and reliability of flexible grips, grip fittings and grip fitting assemblies for tube and hose line connections and kits.

BACKGROUND OF THE INVENTION

Applications of grips, fittings and grip fitting assemblies for tube and hose line connections and kits within industrial and commercial environments require resistance to harsh environments and reliability under stress and strain forces during installation and operation. Such tube and hose lines may involve high pressure hydraulics or air and often require some flexibility of the tube or hose.

For example, air hose connections are commonly found in applications within the freight hauling industry. Such connections use a device known as a gladhand or gladhand coupler. This is an interlocking hose coupling fitted to hoses supplying pressurized air for air brake operation between a tractor cab unit and a freight trailer, or from a locomotive to railway air brakes on railroad cars. Gladhand couplers resemble a pair of "hands shaking" when interlocked and from where their name is derived. Gladhands are designed to allow the driver to manually disconnect hoses between tractor/trailer or between railcars without a mechanic or tools. They sometimes are quick release to speed up brake release time. Often, gladhands are color coded with service lines being blue and emergency brake lines being red. Mated rubber grommets provide a positive seal, and the joined halves may separate during operation if certain pull stresses are present at the hose or tube connection. Gladhand couplers are typically standardized in size and mating geometry which allows them to be connected to each other, for example allowing either end of a railcar to be connected to the end of a train or for one trucking company's tractor cabs to connect to any number of freight trailers.

Inherent to the freight industry is the constant coupling and decoupling of gladhand connections as trailers are left for loading or unloading and other trailers are picked up for delivery. Gladhands are of course affixed to a length of air hose or tube. The manual act of coupling and decoupling gladhands places stress and strain upon the connected hose. This is exacerbated by the fact that gladhands are prone to corrosion making their mating surfaces more difficult to couple and uncouple over time. During installation and operation of an air brake hose in the freight hauling context, the flexible hose undergoes stress from bending, twisting, and kinking, particularly at the fitting ends of the air brake lines. For instance, tractor-trailer operators subject air brake lines to twisting while bending them into position in tight quarters between tractor and trailer. Drivers and fleet maintenance personnel repetitively connect and disconnect air brake lines between the tractor and trailer using hand holds on the hose at the fittings to achieve the needed leverage to secure and release gladhand connections. Connection of tractor to trailer using integrated, multiple hose and tube and cable assemblies, or "kits," requires flexibility in the manner of coupling the multiple fittings to their respective fixed air and hydraulic connections.

Conventional grips, fittings and grip fitting assemblies, however, do not offer sufficient protection against kinking of the hose and tube at the gladhand connections. Conventional hose and tube assemblies using only coiled springs at the fittings are subject to corrosion, and provide inadequate protection from the shearing action that takes place during gladhand connection where the spring coils shift and do not prevent kinking and bending during installation and operation. Some rigid grip aids to the gladhand connection process create a more severe angle during tight radius turns putting further stress on air brake lines at the gladhands, reducing the life of air brake hoses and risking failure under operation of the tractor-trailer air brake system.

When not in use (e.g., tractor cab not connected to a tractor trailer), air hoses are often stored in a manner such that the weight of the dangling gladhand stresses the hose to which the gladhand is connected. Further, gladhand connections to the hose, which often include grips, fittings and grip fitting assemblies, undergo continuous exposure to the elements while in use, often in frigid conditions. Winter road salts and brine, dirt, grease, and other solvents erode fittings and assemblies of critical air brake connections. For tractor-trailer connections, protection of fittings that join the air hose and gladhand from the elements with weather resistant, low-temperature materials and coatings is essential to the safety of the driver and public highway motorists.

What is needed is a coupling mechanism that overcomes these and other disadvantages of conventional fittings and fitting assemblies.

SUMMARY OF INVENTION

One skilled in the art will appreciate that the present teachings can be practiced with embodiments other than those summarized or disclosed below by the Figures and Detailed Description of the Invention to follow.

In general, the present invention includes a tapered flexible grip and interlocking fitting which combined form a grip fitting assembly. The assembly is used to connect a coupling mechanism such as, but not limited to, a gladhand to a length of hose or tubing. It should be understood that hose and tubing, while sometimes used synonymously, have one major difference. Hoses are generally reinforced in some way. Typical reinforcements are imbedded braid reinforcement, wire reinforcement, reinforcement with a stiffer plastic or other material, dual walls or a very heavy wall. Hose is typically used and rated for applications that involve high pressure. Tubing is not reinforced or is sparsely reinforced and is often used for gravity flow or lower pressure applications.

For purposes of the following discussion, the term "hose" will be used though should not be considered as limiting the invention. Likewise, the exemplary embodiment of the inventive assembly being used within a gladhand coupling tractor and trailer air hoses should be understood as but one example of an implementation of the present invention.

Indeed, the present invention may be implemented within a variety of tube and hose line connections for many industrial and commercial applications.

The present invention includes a grip and fitting assembly including: a flexible tapered grip having a substantially tubular interior, a first end of which includes an interior seating surface, an annular lip perpendicular to the interior seating surface, and at least one keyway boss located within a sidewall of the substantially tubular interior along the annular lip and adjacent to the interior seating surface; a fitting having a first coupling end, a second coupling end, a retaining shoulder located between the first coupling end and the second coupling end, and an exterior seating surface located between the retaining shoulder and the first coupling end, the retaining shoulder including at least one keyway recess suitably dimensioned to matingly correspond to the at least one keyway boss; wherein the at least one keyway boss and the at least one keyway recess are configured to interlock upon abutment of the interior seating surface with the exterior seating surface so as to preclude rotational movement between the grip and the fitting.

The present invention also includes a grip and fitting assembly for coupling an air hose to a gladhand coupler, the assembly including: a flexible tapered grip having a substantially tubular interior, a first end of which includes an interior seating surface, an annular lip perpendicular to the interior seating surface, and three keyway bosses located within a sidewall of the substantially tubular interior, the keyway bosses spaced equidistantly along the annular lip and adjacent to the interior seating surface; a fitting having a first coupling end threaded to accept a gladhand coupler, a second coupling end barbed to accept and retain a length of air hose thereon, a retaining shoulder located between the first coupling end and the second coupling end, and an exterior seating surface located between the retaining shoulder and the first coupling end, the retaining shoulder including three keyway recesses each suitably dimensioned to matingly correspond to a related one of the keyway bosses; wherein the keyway bosses and the keyway recesses are configured to interlock upon abutment of the interior seating surface with the exterior seating surface so as to preclude rotational movement between the grip and the fitting.

In one aspect of the invention there is included a grip and fitting assembly including a grip having a substantially tubular interior, a first end of which includes an interior seating surface, an annular lip perpendicular to said interior seating surface. There is at least one keyway boss projecting from a sidewall of said substantially tubular interior and positioned about said annular lip and adjacent to said interior seating surface and a fitting having a first coupling end, a second coupling end, a retaining shoulder located between said first coupling end and said second coupling end. There is an exterior seating surface located between said retaining shoulder and said first coupling end and the retaining shoulder includes at least one keyway recess suitably dimensioned to matingly correspond to said at least one keyway boss. The at least one keyway boss and said at least one keyway recess are configured to interlock upon abutment of said interior seating surface with said exterior seating surface so as to preclude rotational movement between said grip and said fitting.

In one or more embodiments the following features may be included. The retaining shoulder may have an outermost diameter greater than an innermost diameter of said interior seating surface. The retaining shoulder may include a ramped surface, adjacent said second coupling end, facilitating movement of said retaining shoulder across said interior seating surface. The retaining shoulder may include a shoulder surface opposite said ramped surface and perpendicular to said exterior seating surface. The shoulder surface and said annular lip may be configured to snap fit against one another upon abutment of said interior seating surface with said exterior seating surface so as to preclude axial movement between said grip and said fitting in a first direction. The first coupling end may include a threaded portion configured to accept a universal coupling mechanism. The universal coupling mechanism may be a gladhand. The fitting may further include a nut member positioned between the threading portion and the exterior surface configured to contact the first end of the grip upon abutment of said interior seating surface with said exterior seating surface so as to preclude axial movement between said grip and said fitting in a second direction. The second coupling end may be barbed to accept a flexible conduit and wherein the second coupling end is located within the substantially tubular interior of the grip. The flexible conduit may be a length of air hose. There may be more than one said keyway boss and, correspondingly, more than one said keyway recess. There may be included a rail located at a second end of said grip opposite said first end, said rail being thickened. The grip may be formed of a flexible material having a thickness which decreases from the first end of the grip to the rail.

In another aspect of the invention there is included a hose assembly including a hose having a first end and a second end, a swivel coupling affixed to the first end of the hose, a grip and fitting assembly affixed to the second end of the hose. The grip and fitting assembly includes a grip having a substantially tubular interior, a first end of which includes an interior seating surface, an annular lip perpendicular to said interior seating surface. There is at least one keyway boss projecting from a sidewall of said substantially tubular interior and positioned about said annular lip and adjacent to said interior seating surface and a fitting having a first coupling end, a second coupling end, a retaining shoulder located between said first coupling end and said second coupling end. There is an exterior seating surface located between said retaining shoulder and said first coupling end and the retaining shoulder includes at least one keyway recess suitably dimensioned to matingly correspond to said at least one keyway boss. The at least one keyway boss and said at least one keyway recess are configured to interlock upon abutment of said interior seating surface with said exterior seating surface so as to preclude rotational movement between said grip and said fitting.

In other embodiments the following features may be included. The retaining shoulder may have an outermost diameter greater than an innermost diameter of said interior seating surface. The retaining shoulder may include a ramped surface, adjacent said second coupling end, facilitating movement of said retaining shoulder across said interior seating surface. The retaining shoulder may include a shoulder surface opposite said ramped surface and perpendicular to said exterior seating surface. The shoulder surface and said annular lip may be configured to snap fit against one another upon abutment of said interior seating surface with said exterior seating surface so as to preclude axial movement between said grip and said fitting in a first direction. The first coupling end may include a threaded portion configured to accept a universal coupling mechanism. The universal coupling mechanism may be a gladhand. The fitting may further include a nut member positioned between the threading portion and the exterior surface configured to contact the first end of the grip upon abutment of said interior seating surface with said exterior seating surface so as to preclude axial movement between said grip and said fitting in a second direction. The second coupling end may be barbed to accept a flexible conduit and wherein the second coupling end is located within the substantially tubular interior of the grip. The flexible conduit may be a length of air hose. There may be more than one said keyway boss and, correspondingly, more than one said keyway recess. There may be a rail located at a second end of said grip opposite said first end, said rail being thickened. The grip may be formed of a flexible material having a thickness which decreases from the first end of the grip to the rail.

In yet another aspect of the invention there is included a kit having a plurality of hose assemblies, at least one of the hose assemblies including a hose having a first end and a second end, a swivel coupling affixed to the first end of the hose, and a grip and fitting assembly affixed to the second end of the hose. The grip and fitting assembly includes a grip having a substantially tubular interior, a first end of which includes an interior seating surface, an annular lip perpendicular to said interior seating surface. There is at least one keyway boss projecting from a sidewall of said substantially tubular interior and positioned about said annular lip and adjacent to said interior seating surface and a fitting having a first coupling end, a second coupling end, a retaining shoulder located between said first coupling end and said second coupling end. There is an exterior seating surface located between said retaining shoulder and said first coupling end and the retaining shoulder includes at least one keyway recess suitably dimensioned to matingly correspond to said at least one keyway boss. The at least one keyway boss and said at least one keyway recess are configured to interlock upon abutment of said interior seating surface with said exterior seating surface so as to preclude rotational movement between said grip and said fitting.

In yet other embodiments the following features may be included. The retaining shoulder may have an outermost diameter greater than an innermost diameter of said interior seating surface. The retaining shoulder may include a ramped surface, adjacent said second coupling end, facilitating movement of said retaining shoulder across said interior seating surface. The retaining shoulder may include a shoulder surface opposite said ramped surface and perpendicular to said exterior seating surface. The shoulder surface and said annular lip may be configured to snap fit against one another upon abutment of said interior seating surface with said exterior seating surface so as to preclude axial movement between said grip and said fitting in a first direction. The first coupling end may include a threaded portion configured to accept a universal coupling mechanism. The universal coupling mechanism may be a gladhand. The fitting may further include a nut member positioned between the threading portion and the exterior surface configured to contact the first end of the grip upon abutment of said interior seating surface with said exterior seating surface so as to preclude axial movement between said grip and said fitting in a second direction. The second coupling end may be barbed to accept a flexible conduit and wherein the second coupling end is located within the substantially tubular interior of the grip. The flexible conduit may be a length of air hose. There may be included more than one said keyway boss and, correspondingly, more than one said keyway recess. There may be a rail located at a second end of said grip opposite said first end, said rail being thickened. The grip may be formed of a flexible material having a thickness which decreases from the first end of the grip to the rail.

In another aspect of the invention there is included a grip and fitting assembly comprising a grip having a substantially tubular interior, a first end of which includes an interior seating surface, an annular lip perpendicular to said interior seating surface, and a plurality of bosses projecting from a sidewall of said substantially tubular interior and positioned about said annular lip and adjacent to said interior seating surface. There is a fitting having a first coupling end, a second coupling end, a retaining shoulder located between said first coupling end and said second coupling end, and an exterior seating surface located between said retaining shoulder and said first coupling end. The retaining shoulder includes a plurality of keyway recesses suitably dimensioned to matingly correspond to said plurality of keyway bosses and the plurality of keyway bosses and said like plurality of keyway recess are configured to interlock upon abutment of said interior seating surface with said exterior seating surface so as to preclude rotational movement between said grip and said fitting. The retaining shoulder includes a ramped surface, adjacent said second coupling end, facilitating movement of said retaining shoulder across said interior seating surface. The retaining shoulder further includes a shoulder surface opposite said ramped surface and perpendicular to said exterior seating surface and the shoulder surface and said annular lip are configured to snap fit against one another upon abutment of said interior seating surface with said exterior seating surface so as to preclude axial movement between said grip and said fitting in a first direction.

The above and other benefits and advantages of the present invention will be readily apparent from the Brief Description of the Drawings and the Invention and Detailed Description to follow.

BRIEF DESCRIPTION OF THE DRAWINGS

Embodiments of the present invention will now be described, by way of example only, with reference to the attached Figures, wherein:

FIGS. 12A and 12B are a perspective views of hose assemblies with single and dual swivel couplings, respectively, according to an aspect of this invention;

FIG. 14 is a perspective view of another hose assembly with a swivel coupling according to an aspect of this invention installed at one end of the hose and a taper grip assembly at the other end of the hose;

DETAILED DESCRIPTION

The present invention will now be described more fully herein with reference to exemplary embodiments, examples of which are illustrated in the accompanying drawings. Embodiments and implementations set forth in the following detailed description do not represent all embodiments and implementations of the claimed invention. One skilled in the art will appreciate that the present teachings can be practiced with embodiments other than those summarized or disclosed below by the Figures and Detailed Description of the Invention to follow.

For purposes of the following discussion, the terms "hose" and "tube" may be used throughout interchangeably and should not be considered as limiting the invention. Use of either term is meant to encompass both hoses and tubes and all applicable types of such hoses and tubes. Likewise, the exemplary embodiments may describe particular connectors, flexible tapered grips and couplers/connectors, including swivel couplings, however, it should be understood that these are examples of implementations of the present invention. Indeed, the present invention may be implemented within a variety of connectors, flexible tapered grips and couplers/connectors including swivel couplings.

Further, the invention is described herein with regard to transportation applications, in particular trucking; however, there may be other equally suitable applications of the present invention outside of the context of trucking and such applications are well within the intended scope of the present disclosure. In particular, the present invention may be applicable to any suitable mobile or fixed implementations including, but not limited to, air or gas, hydraulic connections, fuel or other fluid transfer, land or marine connections, airplane terminal vestibules, and/or ship-to-shore connections.

A flexible tapered grip assembly for installation in accordance with an aspect of the invention will first be described. Following the description of the flexible tapered grip assembly will be a description of the improved swivel coupling according to another aspect of the invention and then certain hose assemblies/kits using the flexible tapered grip assembly and/or the swivel coupling will be described.

Flexible Tapered Grip

Figure 1:
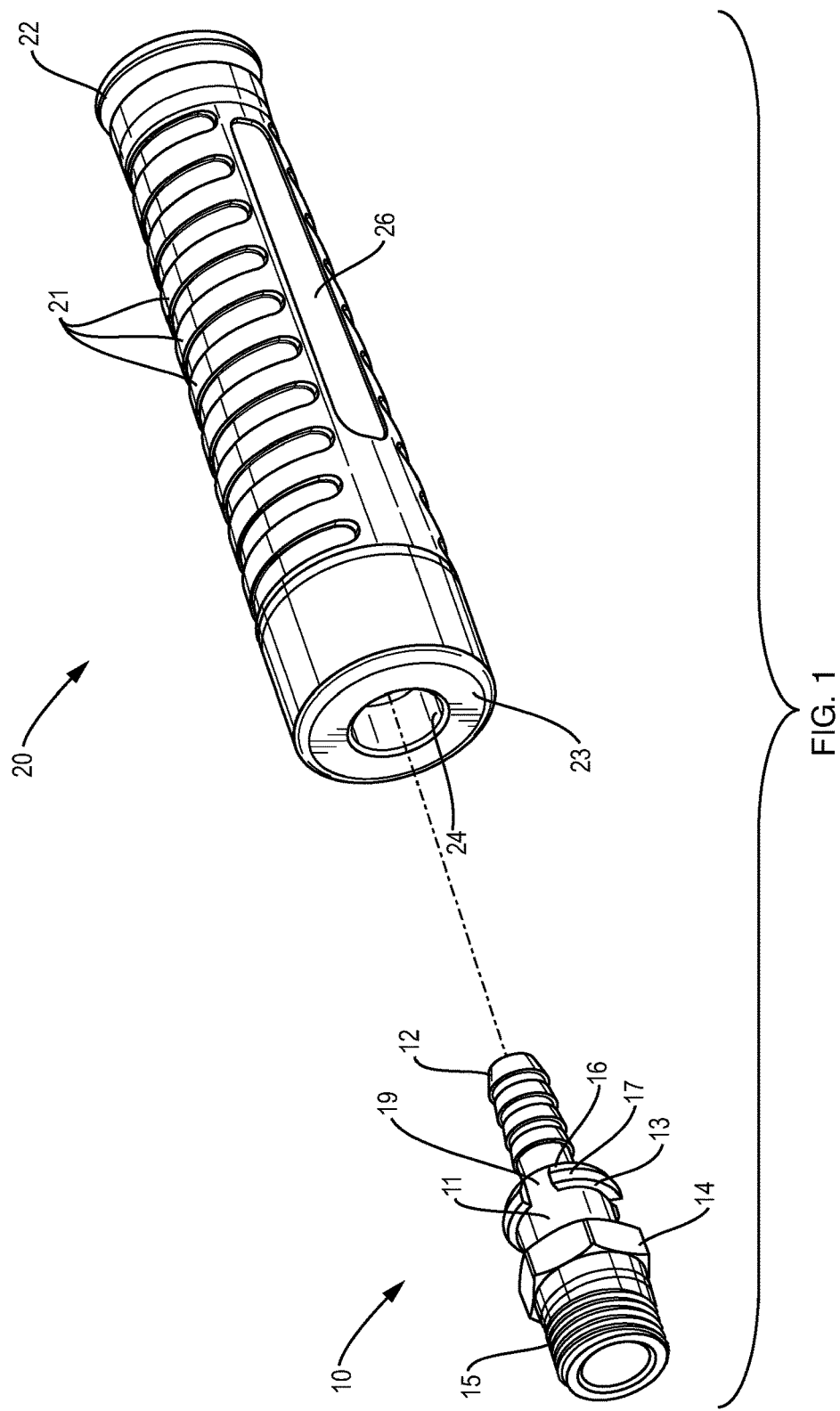
FIG. 1 shows a perspective view of flexible tapered grip assembly according to the present invention shown with grip and fitting sections disconnected.

With regard to FIG. 1, there is seen a three-dimensional illustration showing a flexible tapered grip assembly in accordance with the present invention shown with two sections, one being a fitting 10 and the other being a grip 20. For purposes of illustration, the assembly is shown where the fitting 10 and grip 20 are in a disconnected position relative to one another.

The grip 20 is a both flexible and tapered. Flexibility of the grip provides the ability of the grip to bend and yet return to its original shape. The grip 20 itself is a unitary structure fabricated from material suitable for the intended trucking environment which may be hostile to materials—i.e., where wide temperature variations occur and exposure to road salt and a variety of chemicals may occur. One suitable material includes thermoplastic vulcanizates (TPV) which are part of the thermoplastic elastomer (TPE) family of polymers. TPVs offer a combination of elastomeric properties, like compression and tension set, coupled with aging performance and chemical resistance. Other materials such as, but not limited to, ethylene propylene diene monomer (EPDM) thermoset rubber, nylon, or polyvinyl chloride (PVC) may be possible depending upon the intended environment. For example, PVC may not be suitably used for an intended cold weather implementation where flexibility is severely limited at reduced environmental temperatures. The grip 20 may be formed in any suitable manner including, but not limited to, injection molding. It should also be understood that the grip may be colored during molding and provided in a variety of color schemes (i.e., color coded) in accordance with any desired implementation (e.g. red for emergency brake lines, blue for service lines) and which assists to minimize incorrect tractor/trailer connections With continued reference to FIG. 1 and additional reference to FIG. 2, the grip 20 is seen as tapered from end to end. In particular, the grip 20 has an increased thickness at a first end 23 tapering to an opposite, second end that includes a tear-resistant rail 22. The rail 22 is thickened so as to form a suitably reinforced ring around a length of air hose (shown by dotted line 30).

Oftentimes, such portion of air hose also includes a spring guard (not shown) to assist and support the flexing of the hose. Providing the thickened rail 22 at the spring guard end of the grip 20 prevents tearing of the grip 20 and improves kink resistance of hose and tube made of weather resistant, low-temperature materials and coatings.

The grip 20 includes traction ridges 21 for an additional non-slip feature when the grip 20 is handled by a user. Recessed areas 26 (and 27 visible in FIGS. 3 and 4) may be provided for corporate labeling or cosmetic logos.

A fitting 10 is also shown in accordance with the inventive assembly. The fitting 10 includes a first coupling end 15 and a second coupling end 12 between which is located an exterior seating surface 11. It is the exterior seating surface 11 of the fitting 10 and the interior seating surface 24 of the grip 20 which are intended to abut upon insertion of the fitting 10 into the first end 23 of the grip 20. Such insertion is shown and described further below with regard to FIGS. 5A through 5C.

Figure 2:
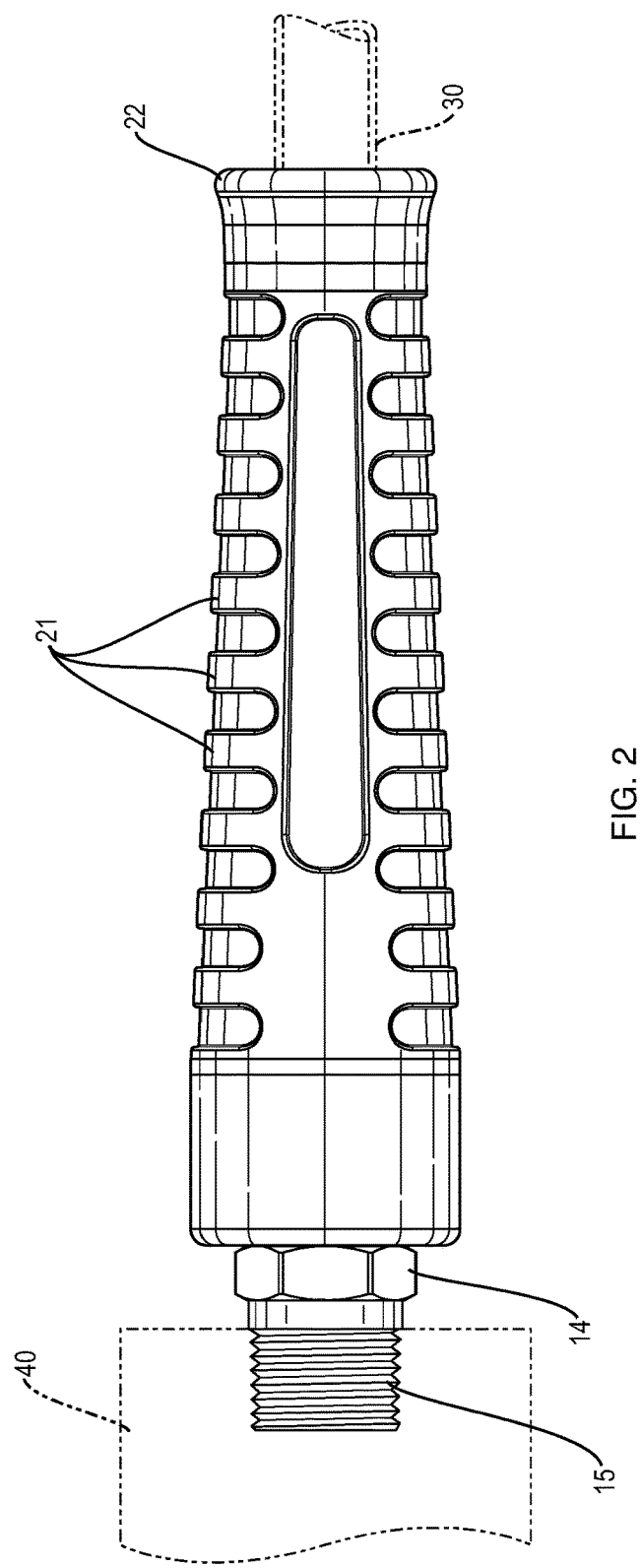
FIG. 2 shows a side view of a complete flexible tapered grip assembly of the invention connected with related elements shown in silhouette.

With continued reference to FIGS. 1 and 2, the fitting 10 is seen to include a retaining shoulder 17 located between the first coupling end 12 and the second coupling end 15. The retaining shoulder 17 has two sides with two very distinct purposes. One side of the retaining shoulder 17 includes a ramped surface 16. The ramped surface 16 is intended as the part of the fitting 10 which first contacts the first end 23 of the grip 20 upon insertion of the fitting 10 into the grip 20. The interior seating surface 11 may also include a beveled edge which facilitates the ramped surface 16 to at least initially contact the interior seating surface 11. The other side of the retaining shoulder 17 includes a shoulder surface 13. The shoulder surface 13 is opposite the ramped surface 16 and is oriented perpendicular to the exterior seating surface 11.

The fitting 10 itself is formed from a corrosion-resistant material such as, but not limited to brass. The first end 15 of the fitting is provided with threading and a hex-nut section 14 of the fitting 10 is provided to enable a user to utilize a wrench to connect the fitting 10 to a coupling mechanism (shown in dotted line as 40). The coupling mechanism 40 may be any suitable universal coupling mechanism such as, but not limited to, the aforementioned gladhand or similar coupler. As should be readily apparent from the description thus far and the accompanying FIG. 2, the inventive grip and fitting assembly provides a new and useful means of connecting a universal coupling 40 to a length of hose 30.

Figure 3:
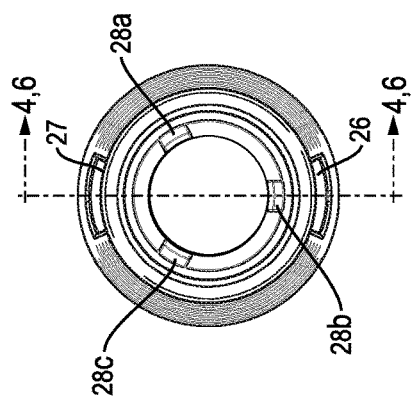
FIG. 3 shows an end view of the grip section of the invention, the end view being from the right end of FIG. 4.
Figure 4:
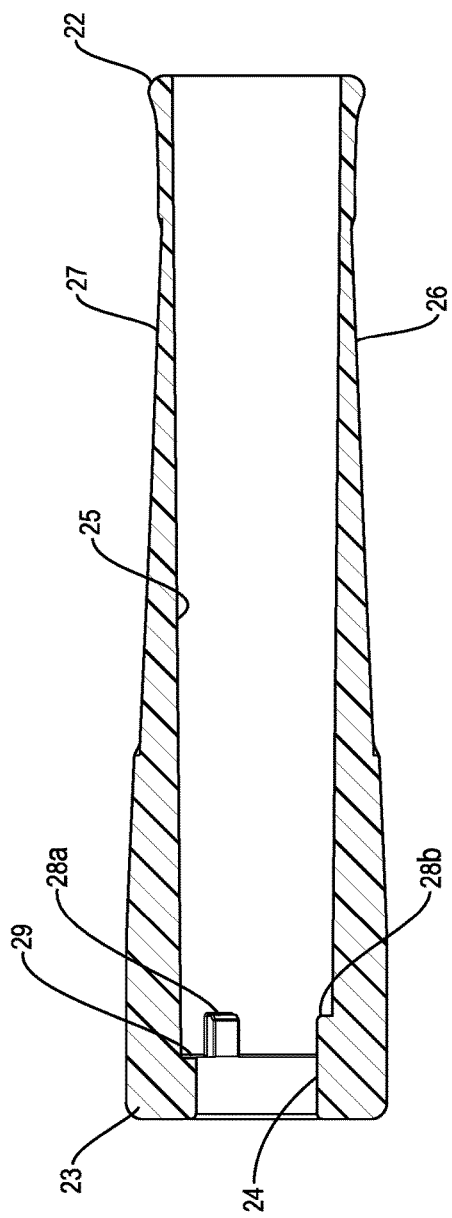
FIG. 4 shows a side section view of the grip section of the invention taken along line 4-4 of FIG. 3.

With reference to FIGS. 3 and 4, there are respectively shown an end view and a side cross section view of the grip 20. In particular, FIG. 3 shows an end view of the grip section of the invention, the end view being from the right end of FIG. 4 while FIG. 4 shows a side section view of the grip section of the invention taken along line 4-4 of FIG. 3. Here, the grip 20 is seen to include three keyway bosses 28a, 28b, 28c with only two 28a, 28b visible in cross section FIG. 4.

It should be understood that each keyway boss 28a, 28b, 28c corresponds to a keyway recess 19 located on the fitting 10. As seen in FIG. 1, the retaining shoulder 17 includes such keyway recesses and which are suitably dimensioned to matingly correspond a related keyway boss though only one of three such keyway recesses are visible. From FIG. 4, it can be seen that each keyway boss (28a and 28b visible) are located within a sidewall 25 of the substantially tubular interior 25 of the grip 20. More specifically, each keyway boss is arranged along an annular lip 29 and adjacent to the interior seating surface 24. It should be noted that while three keyway bosses and three corresponding keyway recesses are discussed, there may be any number of suitable pairs of keyway bosses and recesses such as, but not limited to, one, two, or four.

The annular lip 29 is configured perpendicular to the interior seating surface 24 and provides a surface against which the shoulder surface 13 of the fitting's shoulder 17 firmly abuts once the fitting 10 is completely inserted within the first end 23 of the grip 20.

Figure 5A:
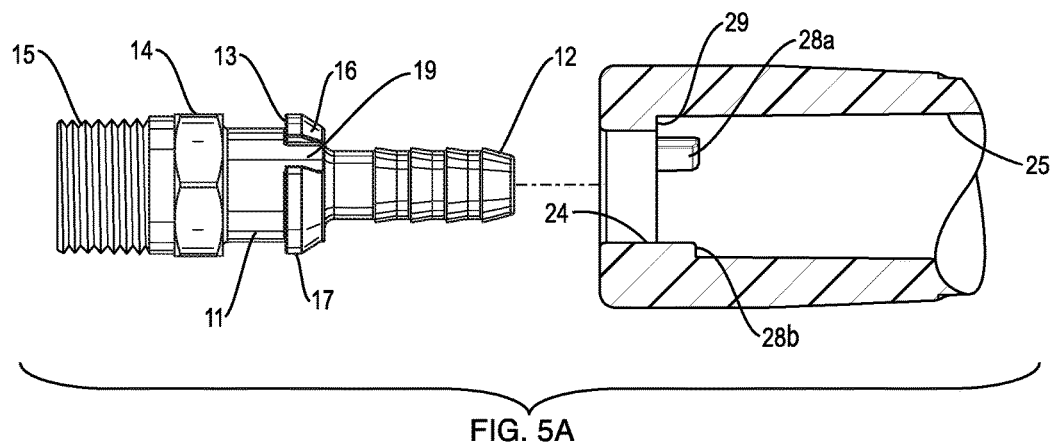
FIGS. 5A through 5C show a series of close-up side views with the fitting section shown intact and a partial length of the grip section shown in a cutaway lengthwise cross section so as to illustrate the before, during, and after stages of fitting insertion into the grip.
Figure 5B:
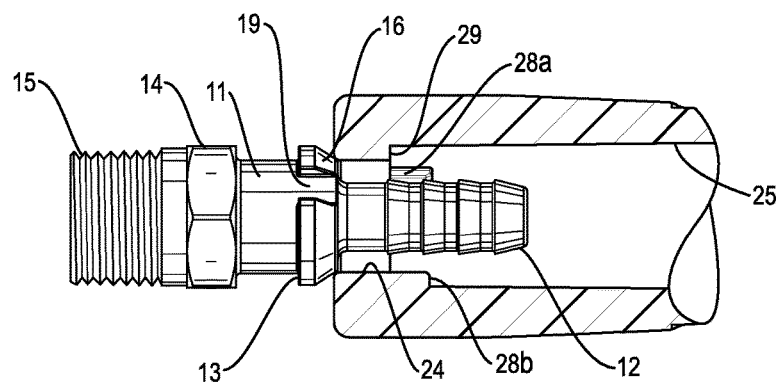
Figure 5C:
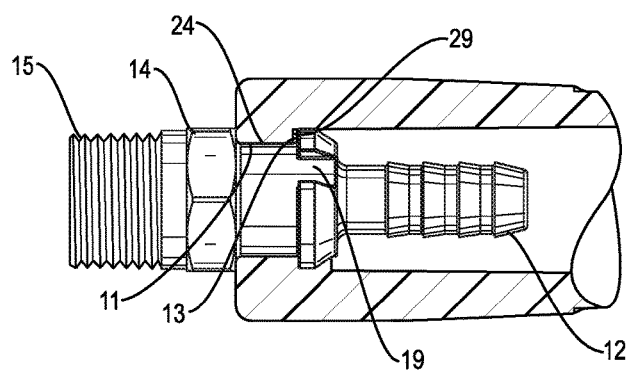

With regard to FIGS. 5A through 5C, there are illustrated a series of close-up side views showing the fitting along with a partial length of the grip. The partial length of the grip is illustrated as a cutaway lengthwise cross section so as to show a chronological series of before, during, and after stages of fitting insertion into the grip.

As shown in FIG. 5B, the ramped surface 16 of the fitting first meets the outer edge of the interior seating surface 24. Such outer edge of the interior seating surface 24 may be beveled to facilitate movement of retaining shoulder 17 through and over the entirety of the interior seating surface 24. Here, it is also visible that the retaining shoulder 17 is sized with an outer dimension slightly larger than the inner dimension of the interior seating surface 24.

It should be understood that the material from which the grip is fabricated will have elastic qualities such that the interior seating surface 24 will expand to allow the retaining should 17 to ride over it, but snap back into place once the retaining shoulder 17 is completely through and past the interior retaining surface 24. This snap-fit action results in the configuration seen in FIG. 5C. Here, the interior seating surface 24 is shown abutting the exterior seating surface 11 of the fitting. Likewise, the annular lip 29 of the grip is shown abutting the shoulder surface 13 which effectively permanently retains the fitting within the grip. Moreover, in such configuration shown, each keyway boss 28a-28c and each corresponding keyway recess 19 interlock with one another upon abutment of the interior seating surface 24 with the exterior seating surface 11 so as to preclude rotational movement between the grip and the fitting. In this manner, both rotational and axial movement of the fitting within grip is prevented as the two are locked into place.

Figure 6:
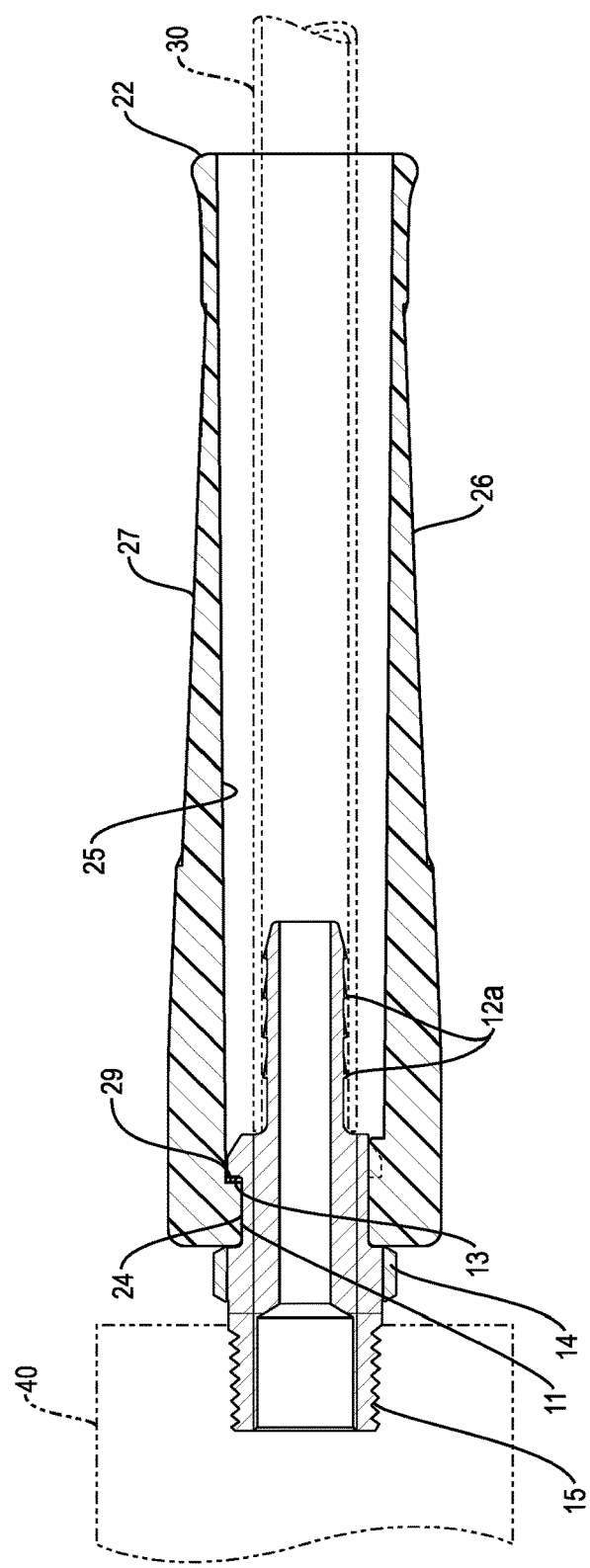
FIG. 6 shows a side view of the complete flexible tapered grip assembly of the invention connected with related elements shown in silhouette taken along line 6-6 of FIG. 3.

FIG. 6 illustrates a side view of the complete flexible tapered grip assembly taken along line 6-6 of FIG. 3. Here, the invention is shown after the fitting is snap-fit into the grip and after the fitting is threaded to a coupling mechanism 40 and length of tubing 30. In particular, it should be noted that the fitting includes barbs 12a, or some suitable structure, which retain the length of tubing 30 upon the fitting. The tubular interior 25 of the grip itself is also suitably larger than the outer diameter of the tubing 30 so as to allow both unrestricted movement of the tube and yet still allow the grip to function as a strain relief boot with integrated fitting for hydraulic connections. Thus, the present invention is a dual purpose strain relief boot and a grip for manual manipulation of a coupler (e.g., gladhand). Likewise, the space provided between the tubular interior 25 and the outer diameter of the tubing 30 also enables a coil spring (not shown) to be inserted over the tubing 30 all the way up to the fitting, further enhancing flexibility of the inventive assembly.

The strain relief aspect of the present invention also provides an "anti-kinking" characteristic such that the tubing attached to the fitting through the tapered grip section is precluded from kinking. Unrestricted movement of the tube within the grip at the end opposite the fitting occurs only to a point at which bending of the given tube will result in the tube coming into contact with the sidewall of the grip. Due to the tapered nature of the grip, the ability of the grip to bend along with the tube is a function of the thickness of the grip. The thinner end will therefore bend along with the abutting tube in a manner that is proportional with the varied thickness of the grip wall. This tapering provides flexible support of the tube while inhibiting the ability of the tube to kink. This is effective against kinking that may otherwise (in the absence of the present invention) occur during the time of connection or at the time of operation (e.g., during a turning of the tractor cab relative to the trailer). Elongation of the grip may be provided so as to further enhance the anti-kinking characteristics of the present invention. In such elongation instance, the grip may be provided in successively tapering sections interconnected to one another.

It should therefore be understood that the sidewall of the flexible tapered grip decreases in thickness along the substantially tubular interior from fitting end to a tear-resistant rail end, so as to oppose kinking of the tube during installation and operation. Moreover, the tear-resistant rail engages with the tube upon minimal bending radius, so as to provide freedom of movement of the tube during initial bending. Thus, the opposing of kinking of the tube is an increasing function of the decrease in thickness from fitting end to rail end and elongation of the flexible tapered grip. In this manner, the grip is elongated along the tube so as to increase anti-kinking characteristics of the overall grip and fitting assembly relative to the tube.

Figure 7:
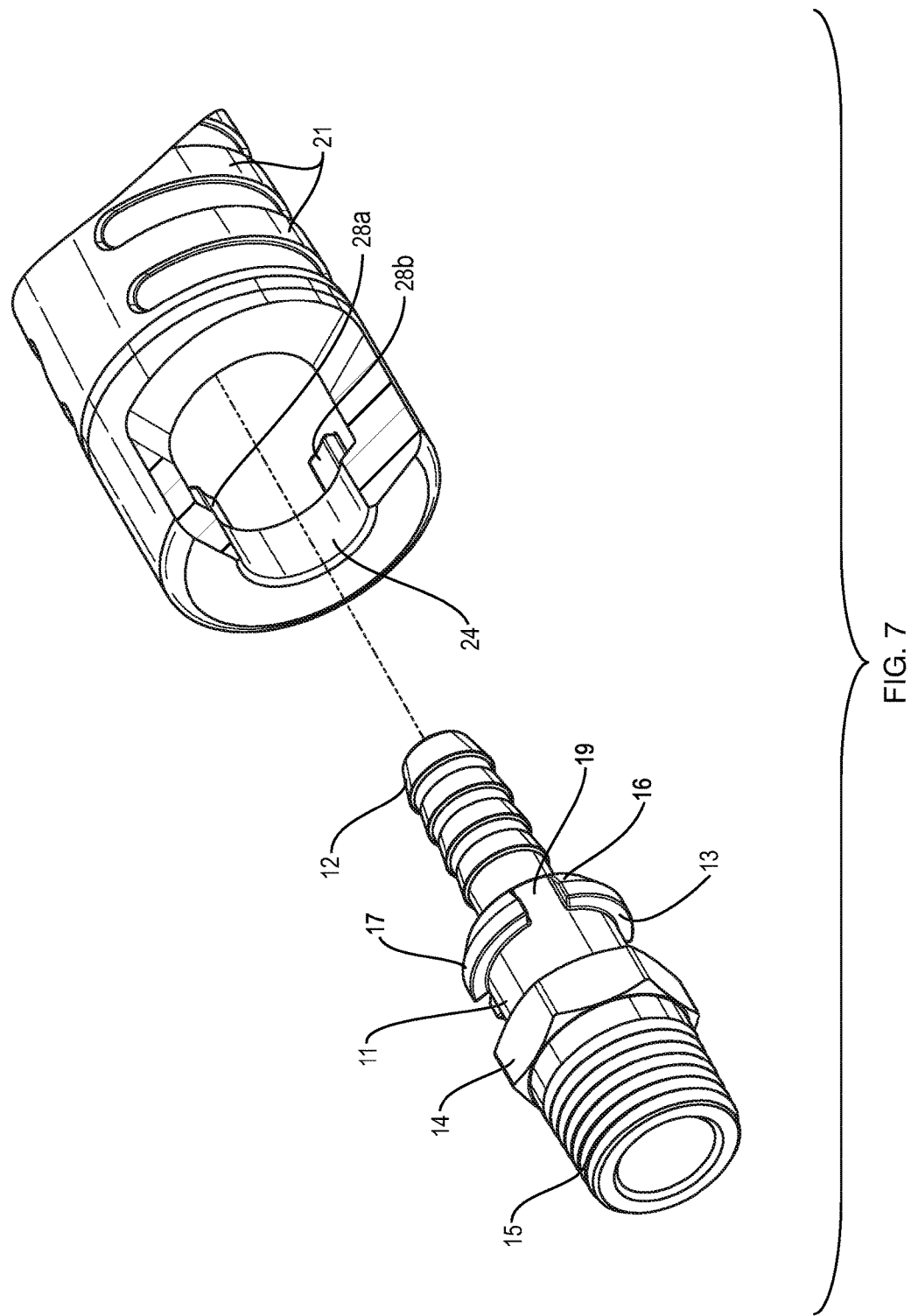
FIG. 7 shows a close-up view of the flexible tapered grip assembly according to the present invention shown with grip and fitting sections disconnected and the grip section partially cutaway to reveal internal keyway boss structures.

FIG. 7 is provided so as to more clearly illustrate the details of the internal keyway boss structures. Here, a close-up view of the flexible tapered grip assembly according to the present invention shows the grip and fitting sections disconnected and the grip section partially cutaway to reveal the internal keyway bosses 28a, 28b. Though three exist, it should be readily apparent that due to the cutaway aspect of FIG. 7 only two are shown. From this figure, it should be readily apparent that each keyway boss is formed integrally with the grip as part of the sidewall of the tubular interior 25. Moreover, the keyway boss has a surface that is collinear with the interior seating surface 24. Thus, the keyway boss structures are internal and integral with the unitarily formed grip.

In terms of implementation and use of the present invention, when used in conjunction with the all brass, corrosion-resistance fittings of the present invention, the grip and fitting assembly of the present invention provides improved bend and kink resistance during installation, operation, and gladhand connections and disconnections. Specifically, the present invention provides an improved thermo-composite flexible tapered grip and fitting design, the grip having increased thickness at the fitting end tapering to a tear-resistant rail at the hose and tube end of the fitting. The flexible tapered grip and grip fitting of the present invention further simplifies manufacture of the grip fitting assembly reducing cost and providing for longer operational life under bending and kinking.

Swivel Coupling

Figure 8:
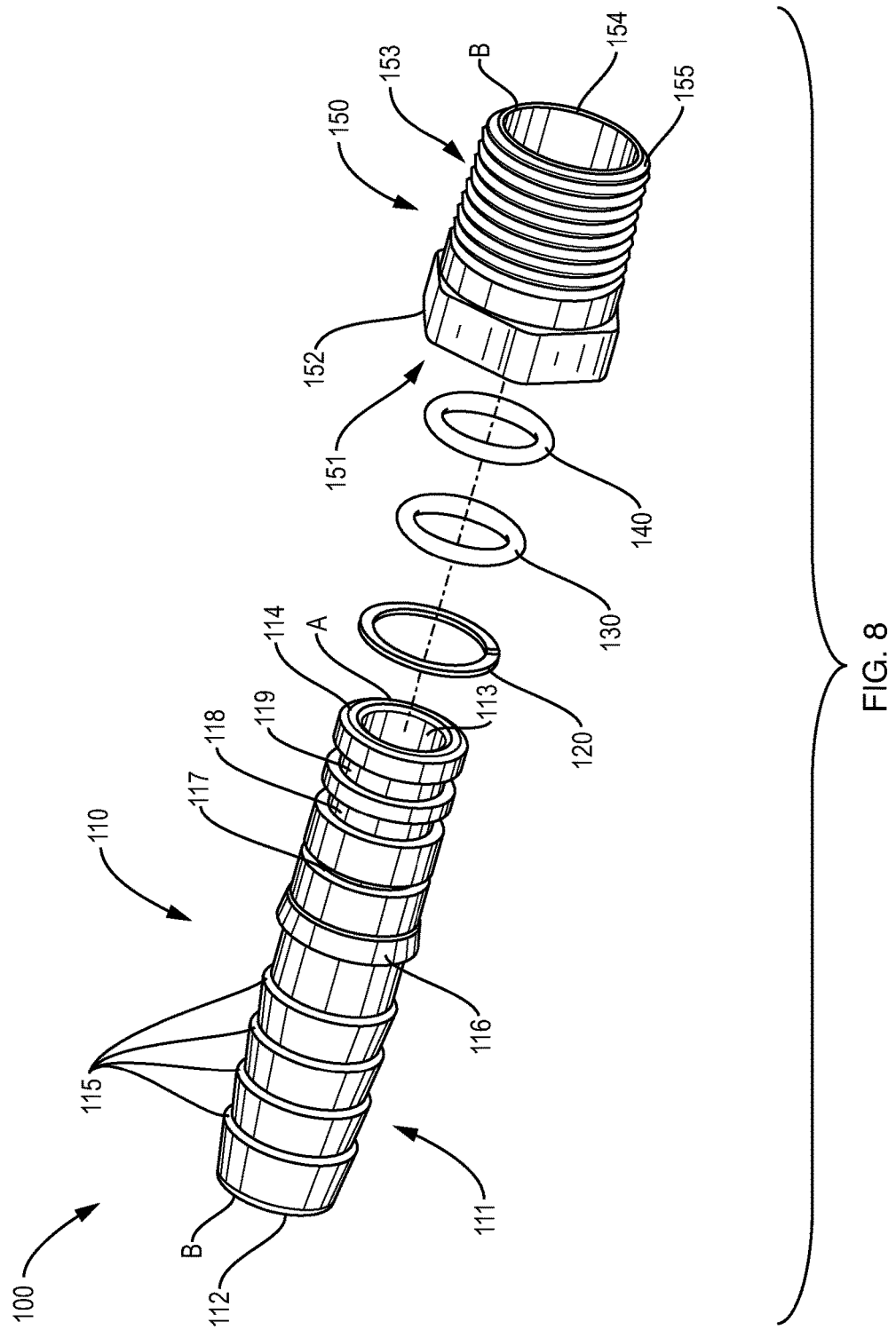
FIG. 8 is an exploded perspective view of the swivel coupling assembly according to this invention.

Referring to FIG. 8, there is shown a swivel coupling assembly 100, according to another aspect of this invention, in an exploded view depicting the two sub-assemblies, namely, annular barb insert assembly 110 and annular fitting sub-assembly 150. When joined the sub-assemblies form a rotatable coupling to interconnect, for example, two fluid carrying hoses (not shown), one affixed to each sub-assembly at ends 112 (barb insert end) and 154 (fitting assembly end), respectively. It should be noted that various size hoses may be accommodated by changing the sizes of the ends 112 (barb insert end) and 154 (fitting assembly end) of the sub-assemblies and the overall diameter of the swivel coupling assembly.

Barb insert assembly 110 is a machined metallic part formed of brass or a comparable material having an outer surface 111 with a varying radius along its length and an inner surface 113 defining a bore through which fluid may flow between the hoses interconnected by the swivel coupling assembly 100. On outer surface 111 of barb insert assembly 110 there is a barb insert 114 spaced from barb insert end 112, along the longitudinal axis A of barb insert assembly 110, and at the opposite end of said assembly. Beginning at end 112 are formed a series of annular barbs 115 (in this example there are four but there may be greater or fewer depending on the application) which are designed to be inserted into a hose up to approximately shoulder 116 and provide a certain amount of gripping force to hold the hose in place on barb insert assembly 110. The amount of gripping force may not be sufficient to hold the hose in place in the hostile environments encountered by these components, therefore, a metal crimp (not shown) may be installed over the hose in the area of the barb insert assembly to more securely hold the hose in place.

Between shoulder 116 and barb insert 114 are formed three annular grooves 117, 118, and 119 in outer surface 111 of barb insert assembly 110. The groove closest to shoulder 116 may be a retaining ring groove 117 in which retaining ring 120 is disposed. The diameter of the retaining ring 120 is slightly larger than the diameter of the outer surface 111 in the area adjacent to the retaining ring groove 117, which results in the retaining ring protruding above the outer surface 111 when it is disposed in the retaining ring groove 117. Retaining ring 120 may be formed of a metal, such as stainless steel, carbon steel or the like, to provide it with sufficient stiffness to hold the two sub-assemblies in place when they are interconnected, as described below. Retaining ring 120 is constructed in the form of a coil so that as force is applied about the circumference it compresses and its diameter is reduced and when the force is terminated the ring expands to its neutral position with an increased diameter. The width of groove 117 is only slightly larger than the width of retaining ring 120, allowing for insertion of the ring but providing a friction fit so as to retain it in place.

Grooves (or glands) 118 and 119 are also disposed in outer surface 111, but they are further along the longitudinal axis A and closer to barb insert 114 than groove 117. Grooves 118 and 119 may have a width greater than groove 117, so they can accommodate O-ring seals 130 and 140, respectively, which may have a greater width than retaining ring 120. The diameters of O-ring seals 130 and 140 are slightly larger than the diameter of the outer surface 111 in the area adjacent to grooves 118 and 119, which results in the O-ring seals protruding just above the outer surface 111 when they are disposed in the grooves. In this example, groove 119 abuts barb insert 114.

Still referring to FIG. 8, at end 154 of annular fitting assembly 150 are a series of threads 153 on the outer surface for engaging with the inner surface of a hose (not shown), for example.

Opposite end 151 has a hexagonal nut 152, which may be engaged by a wrench or other appropriate tool to apply torque to the annular fitting assembly 150 as it is installed on the hose. Inner surface 153 defines a bore through which fluid may flow between the hoses interconnected by the swivel coupling assembly 100.

Figure 9A:
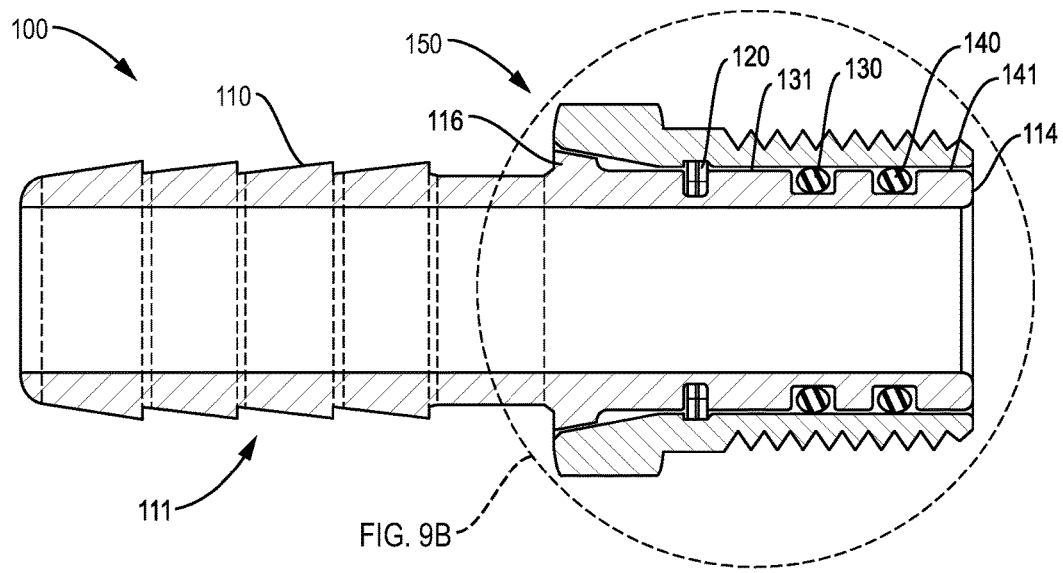
FIGS. 9A and 9B show a cross-sectional view of the swivel coupling assembly of FIG. 8 taken along line B-B.
Figure 9B:
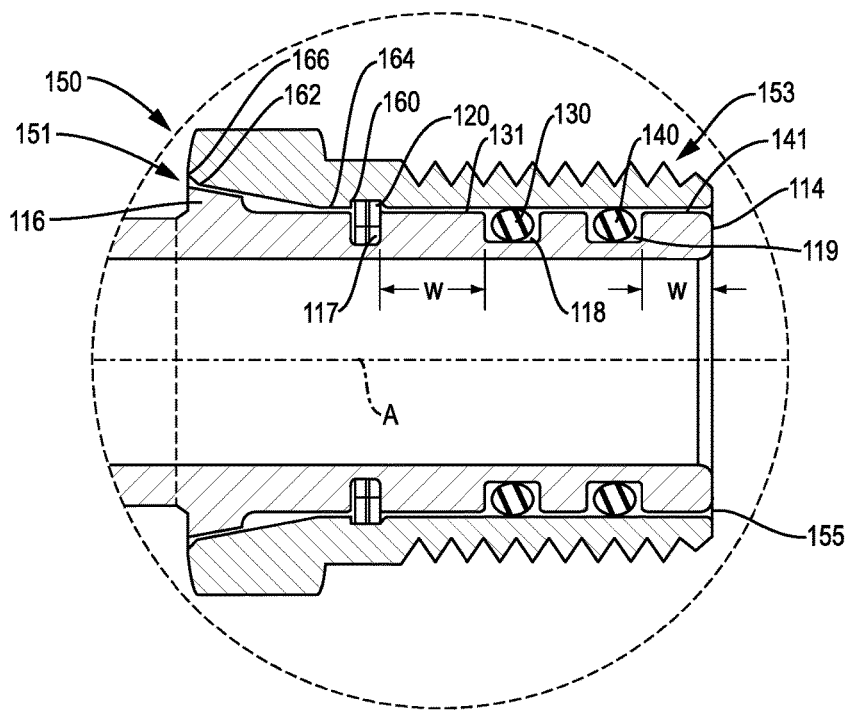

A cross-sectional view of swivel coupling assembly 100 is shown in FIGS. 9A and 9B with annular barb insert assembly 110 and annular fitting sub-assembly 150 joined to form a rotatable coupling. When the sub-assemblies are joined, outer surface 111 of barb insert assembly 110 (within fitting assembly 150) is mated with inner surface 155 annular fitting sub-assembly 150 and barb insert 114 is substantially aligned with end 154. At the opposite end 151 of annular fitting sub-assembly 150, barb insert shoulder 116 is mated with inner surface 155 and forms a frictional connection to allow for rotation of the annular barb insert assembly 110 with respect to the annular fitting sub-assembly 150.

Still referring to FIGS. 9A and 9B, retaining ring 120 is positioned in annular recess 160 formed in inner surface 155 and also in retaining ring groove 117. In this position, the annular barb insert assembly 110 and annular fitting sub-assembly 150 are locked together in place preventing them from being pulled apart. Retaining ring 120 is designed to withstand axial forces sufficiently greater than those likely to be encountered by the components under normal environmental conditions.

O-ring seals 130 and 140 are shown in a compressed state in annular grooves/glands 118 and 119, respectively, since the diameter of the bore in annular fitting sub-assembly 150 defined by inner surface 155 is slightly smaller than the diameters of O-ring seals 130 and 140. This forms tight seals with inner surface 155 to prevent fluids from flowing in the gap defined by outer surface 111 of annular barb insert assembly 110 and inner surface 155 of annular fitting sub-assembly 150. In addition, wide bearing surfaces 131 and 141 are included adjacent to O-rings 130 and 140, respectively, which are in contact with and bear against inner surface 155 of annular fitting sub-assembly 150 to provide stable bearing surfaces to protect the O-rings from abnormal loading. This is particularly important as the components wear over time and may otherwise become susceptible to wobble during rotation. By wide, what is meant is that the bearing surfaces are at least as wide as the width of the annular grooves/glands 118 and 119 and preferably wider. The typical range for each bearing surface may be from 1 to 3.5 times wider than the annular grooves. In this embodiment, it should be noted that bearing surface 131 is the external surface of barb insert 114.

By way of example, bearing surface 131 may be 0.186 in. in width and bearing surface 141 may be 0.113 in. in width. With annular grooves 118/119 having a width of 0.095 in. the bearing surfaces 131 and 141 are respectively 1.19 and 1.86 times the width of the annular grooves.

These dimensions are provided only as an example and should not be considered as limiting the scope of the invention.

The O-ring seals 130 and 140 as well as the retaining ring 120 and the outer surface 111 in the region of the annular barb insert assembly 110 inside the bore of annular fitting sub-assembly may be coated with a lubricant to provide for a smoother and easier insertion and rotational movement when the coupling is installed. To further facilitate a smoother and easier insertion, proximate end 151 of annular fitting assembly 150, the opening to the bore defined by inner surface 155 at location 162 is shown to have a wider diameter than the nominal diameter of the bore, such as at location 164 and throughout the rest of the bore to end 154 (excluding annular recess 160). From location 164 to 162 the diameter of inner surface 155 gradually increases at fixed angle relative to longitudinal axis A (approximately 5 to 10 degrees) about the circumference of the bore, thus forming a frusto-conically shaped section between locations 162 and 164. From location 162 to the end 151 is formed a chamfered outer edge 166 which further helps in the smooth insertion of the annular barb insert assembly 110 into the annular fitting assembly. In particular, chamfered edge 166 is helpful in transitioning the retaining ring 120 as it goes from its normal expanded position and it begins to be compressed when it enters the bore.

During the assembly process, as retaining ring 120 encounters chamfered edge 166 it is guided into place and once it enters the bore at location 162 the force and compression on retaining ring 120 begins and gradually increases until the ring reaches location 164. As the retaining ring is pressed further into the bore beyond location 164, it encounters annular recess 160, at which point the force on the circumference of the retaining ring 120 is removed and retaining ring 120 expands and locks in place in annular recess 160. Once locked in place in annular recess 160, the retaining ring 120 prevents further movement of annular barb insert assembly 110 in either direction in the bore. Once in the installed position it can be seen that the outer surface of shoulder 116 is angled in a complimentary fashion to the inner surface 155 of the annular fitting assembly in that region to allow for a proper frictional fit and enable rotation between the two sub-assemblies.

Figure 10:
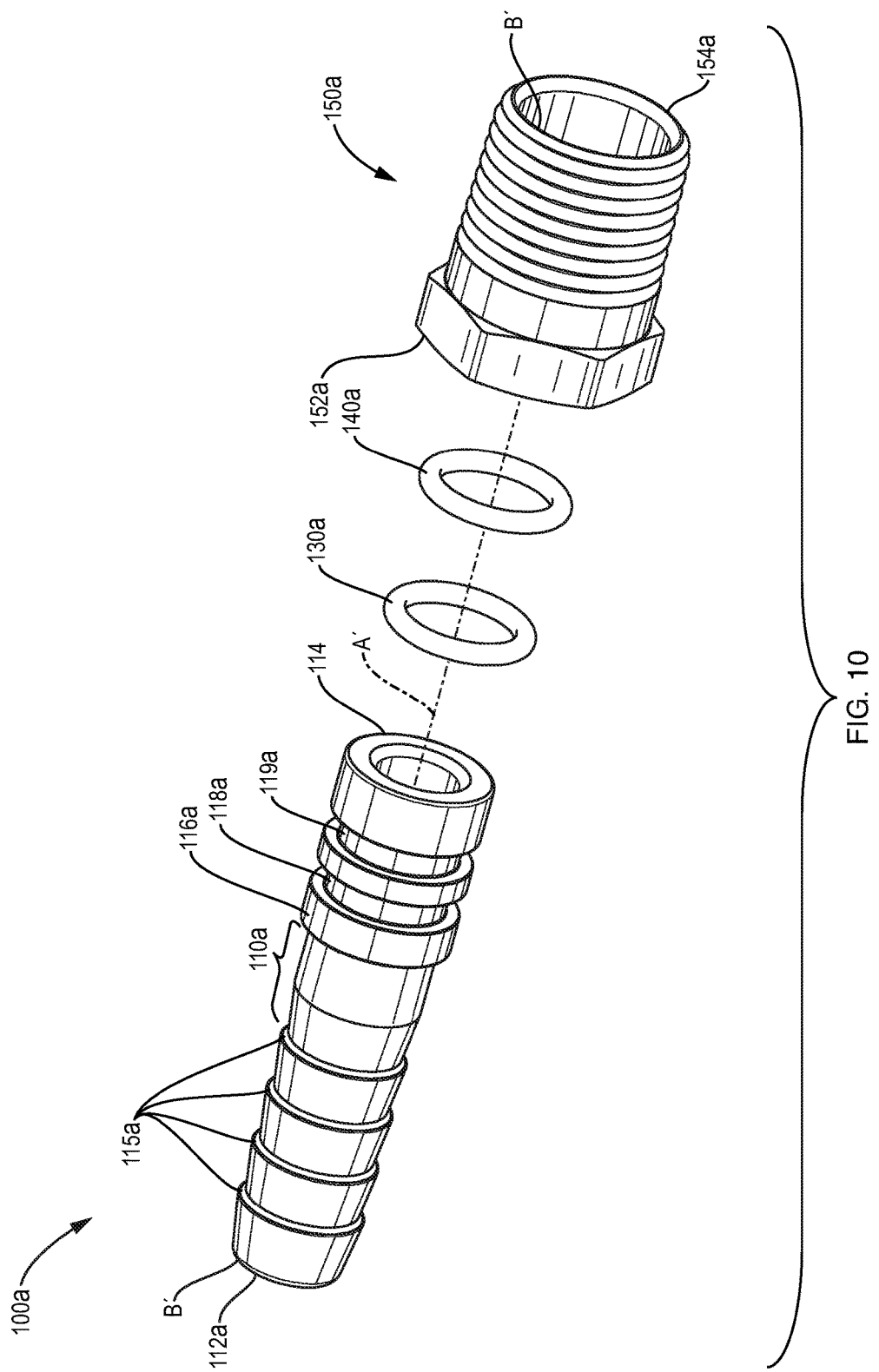
FIG. 10 is an exploded perspective view of another embodiment of the swivel coupling assembly according to an aspect of this invention.
Figure 11A:
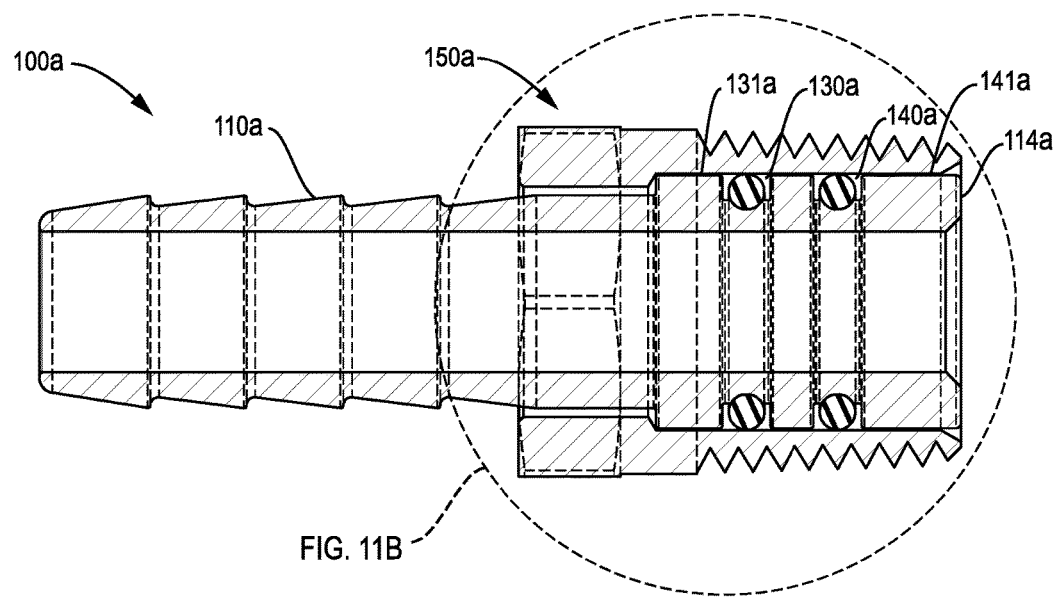
FIGS. 11A and 11B show a cross-sectional view of the swivel coupling assembly of FIG. 10 taken along line B'-B'.

An alternative embodiment of the swivel coupling assembly 100 of FIG. 8 is shown in FIGS. 10 and 11A/11B, as swivel coupling assembly 100a, which includes annular barb insert assembly 110a and annular fitting sub-assembly 150a. Most aspects of this swivel coupling assembly are the equivalent of swivel coupling assembly 100. The most notable difference is that there is no retaining ring groove or retaining ring used in this embodiment. Corresponding components in swivel coupling assembly 100 of FIG. 8 are similarly numbered in swivel coupling assembly 100a of FIG. 10 with the addition of letter designation "a".

Figure 11B:
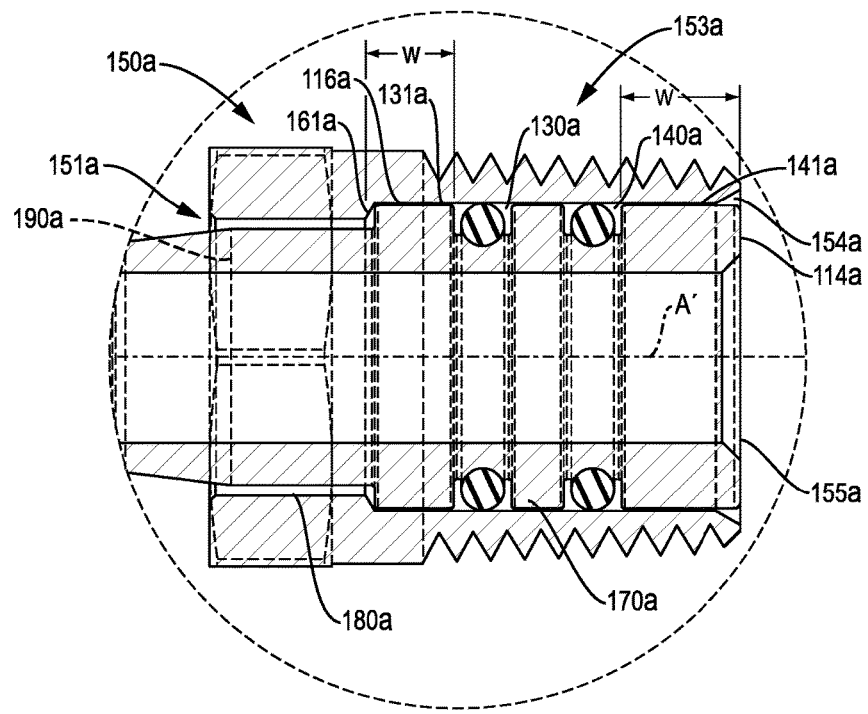

Referring to FIGS. 11A and 11B, the manner of assembling and retaining the annular barb insert assembly 110a and annular fitting sub-assembly 150a is depicted. Annular barb insert assembly 110a is inserted into annular fitting sub-assembly 150a through end 154a until the front side of shoulder 116a of barb insert assembly 110a abuts stop 161a formed in the inner surface 155a by changing the diameter of the bore defined by inner surface 155a in region 170a from a first diameter to a second, smaller diameter of the bore defined by inner surface 155a in region 180a. At the transition point, the stop 161a is formed. In this position, the outer surface 111a of section 190a of barb insert assembly 110a is mated with inner surface 155a in region 180a. It should be noted that the inner surface 155a in region 180a is not angled as there is no need for a wider opening and an angled transition as is the case with the embodiment of FIGS. 8 and 9, due to the absence of retaining ring 120.

As with the embodiment in FIGS. 9A and 9B, in the embodiment of FIGS. 11A/11B wide bearing surfaces 131a and 141a are included adjacent to O-rings 130a and 140a, respectively, which are in contact with and bear against inner surface 155a of annular fitting sub-assembly 150a to provide stable bearing surfaces to protect the O-rings from abnormal loading. By wide, what is meant is that the bearing surfaces are at least as wide as the width of the annular grooves/glands 118a and 119a and preferably wider. In this embodiment, it should be noted that bearing surface 131a is the external surface of barb insert 114a.

The typical range for each bearing surface may be from 1 to 3.5 times wider than the annular grooves. By way of example, in this embodiment, bearing surface 131a may be 0.155 in. in width and bearing surface 141a may be 0.310 in. in width. With annular grooves 118a/119a having a width of 0.095 in. the bearing surfaces 131a and 141a are respectively 1.63 and 3.26 times the width of the annular grooves. Again, this is merely a specific example and should not be considered as limiting the scope of the invention.

The O-ring seals 130a and 140a and the outer surface 111a in the region of the annular barb insert assembly 110a inside the bore of annular fitting sub-assembly may be coated with a lubricant to provide for a smoother and easier insertion and rotational movement when the coupling is installed. To further facilitate a smoother and easier insertion, proximate end 151a of annular fitting assembly 150a has a chamfered outer edge 166a which further helps in the smooth insertion of the annular barb insert assembly 110a into the annular fitting assembly.

Hose Assemblies and Kits Utilizing the Grip and/or Swivel Coupling

As indicated above, various hose assemblies and kits using the flexible tapered grip assembly and/or the swivel coupling will be described. As shown in FIG. 12A, hose assembly 200a includes hose 210a which can be of any desired diameter and/or length. On a single end of hose 210a is installed a swivel coupling assembly such as the swivel coupling assembly 100, as described above. It should be noted that swivel coupling 100a could be used instead of swivel coupling 100. The swivel coupling assembly is secured to hose 210a using crimp 216a. On the other end of hose 210a may be installed a fitting other than the swivel coupling. Similarly, hose assembly 200b shown in FIG. 12B includes hose 210b of any length but in this case, on each end of hose 210b, is installed a swivel coupling assembly such as swivel coupling assembly 100, as described above.

It should be noted that swivel coupling 100a could be used instead of swivel coupling 100. The swivel coupling assemblies are secured to hose 210b using crimps 216b and 218b, respectively.

Figure 13B:
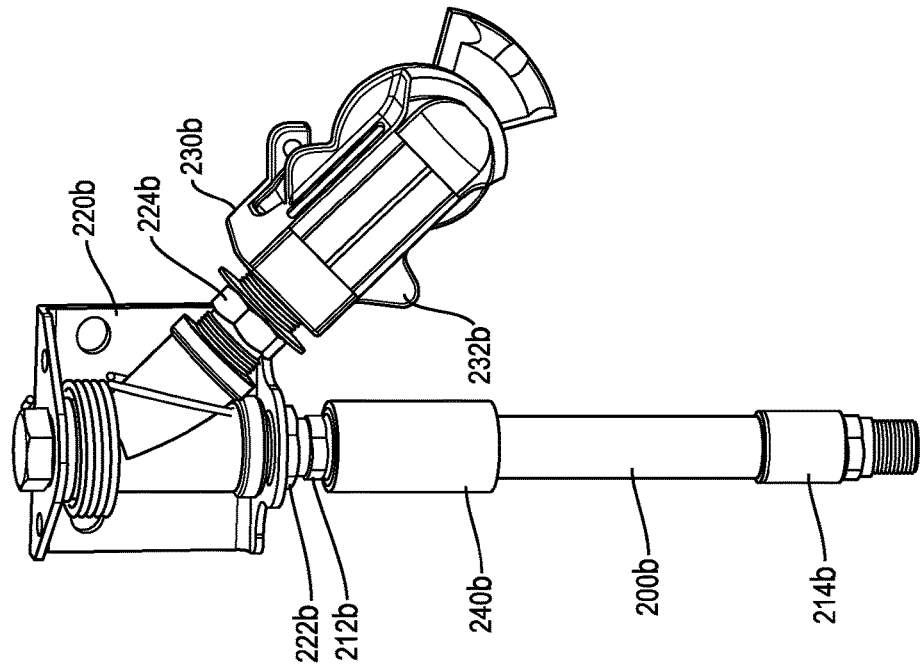
FIGS. 13A and 13B are perspective views of a hose assemblies having swivel couplings installed gladhand "swinger" fixtures, according to an aspect of this invention.
Figure 13A:
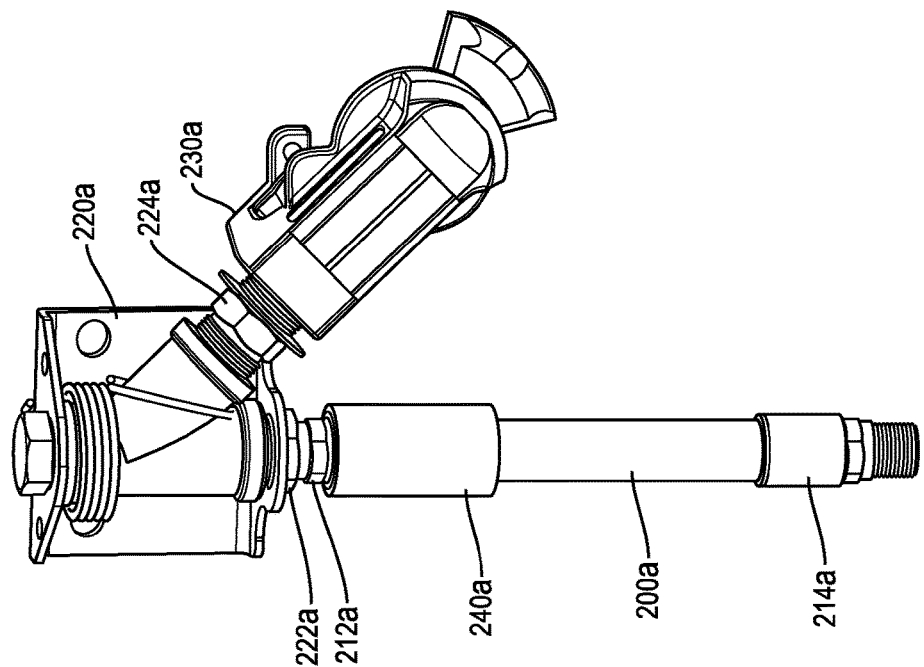

One application of hose assembly 200 is shown in FIG. 13 to be installed on a coupling fixture application for use with a gladhand. A coupling fixture may include a swinger assembly or a pair of swinger assemblies affixed to a bulkhead (not shown). Hose assemblies 200a and 200b are shown to be affixed to coupling fixtures 220a and 220b, respectively. Hose assemblies 200a and 200b are affixed to first ports 222a and 222b by means of swivel coupling assemblies 212a and 212b, respectively. Second ports 224a and 224b of fixtures 220a and 220b are connected to gladhand fixtures 230a and 230b. Installed over hose assembly 200a about swivel coupling assembly 212a is swinger collar 240a. Installed over hose assembly 200b about swivel coupling assembly 212b is swinger collar 240b. Swinger collars 240a and 240b may contain markings or color coding to make apparent to which coupling fixture they are to be attached, for example, red for the "emergency brake" gladhand of FIG. 13A and blue for the normal braking gladhand of FIG. 13B also distinguished by "ear" 232b. For example, swinger collar 240a may be the same color as glad hand 230a to make proper connection very easy for the installer. Likewise, swinger collar 240b may be the same color as gladhand 230b.

In another application, shown in FIG. 14, a hose coil assembly 300 is shown to include a length of hose 302, which may be plated with heavy duty, corrosion resistant spring guards 304 (although it is not a requirement). Assembly 300 may be an air coil assembly or may be any assembly having a first and second end onto to which grips and fixtures as described herein are applied. On a first end of hose 302 may be installed a swivel coupling assembly 306, such as swivel coupling assembly 100 or 100a described above. On a second end of hose 302 may be installed a grip assembly 308, such as the flexible tapered grip assembly described herein with regard to FIGS. 1-7. However, it should be noted that any suitable grip assembly could be used for grip assembly 308.

Figure 15A:
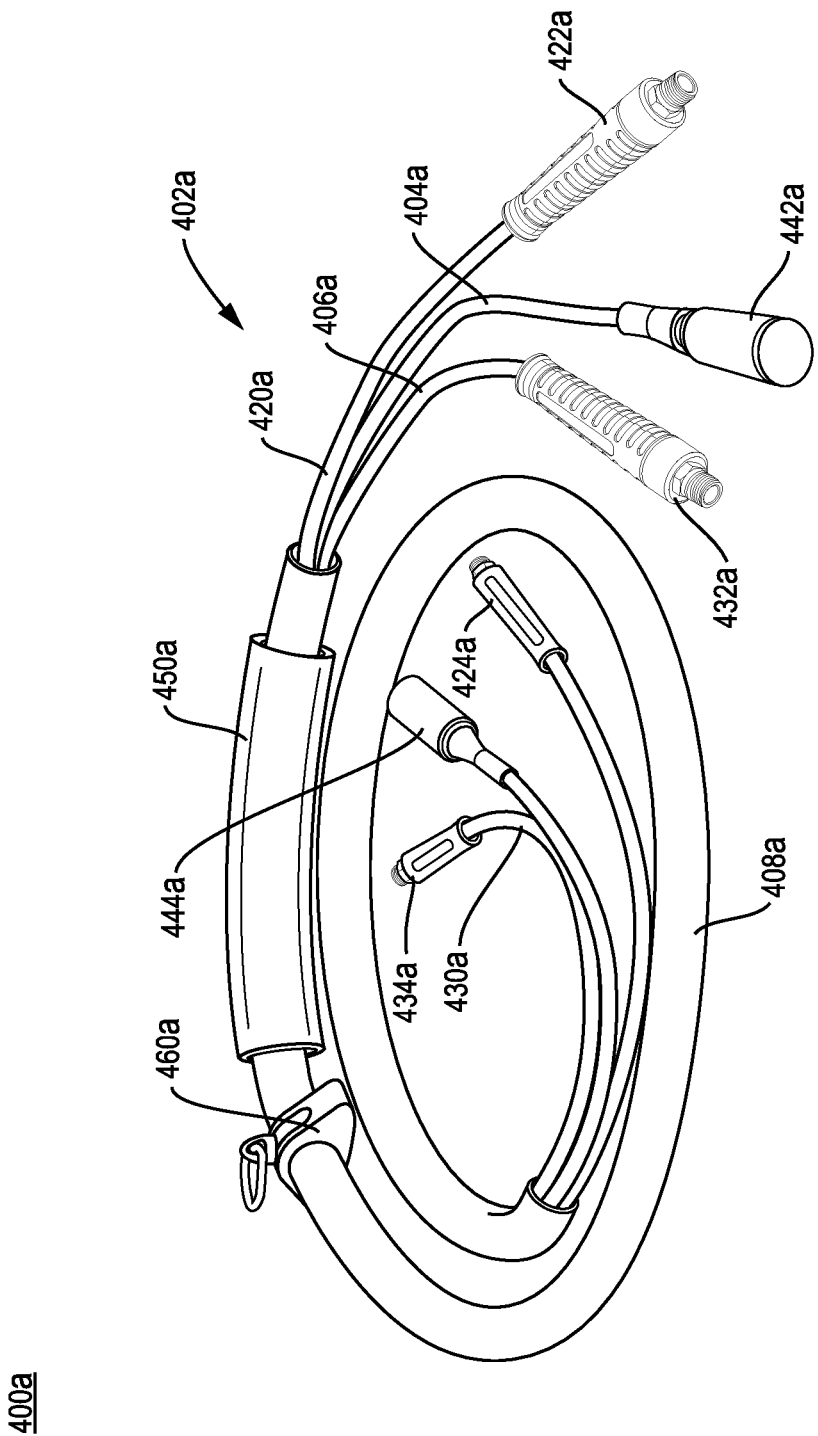
FIGS. 15A and 15B are perspective views of kits including hose and tube assemblies having a swivel coupling according to an aspect of this invention installed at one end of the hose and a taper grip assembly at the other end of the hose.

In FIG. 15A, there is shown a kit 400a which includes two or more assemblies, such as assemblies 402a, 404a, and 406a required for a particular installation, wherein the assemblies are neatly bundled together by a heavy duty spiral wrap 408a. Assembly 402a may be comprised of a hose 420a with a grip assembly 422a installed on one end and a swivel coupling 424a installed on the other end. Similarly, assembly 406a may be comprised of a hose 430a with a grip assembly 432a installed on one end and a swivel coupling 434a installed on the other end. The swivel coupling assemblies may be the same as swivel coupling assembly 100 or 100a described above. The grip assemblies may be the same as the flexible tapered grip assembly described herein with regard to FIGS. 1-7. However, it should be noted that any suitable grip assembly could be used for grip assemblies. Assembly 404a may be an electrical power assembly and comprises cable 440a which has electrical connectors 442a and 444a disposed on either end of cable 440a. Kit 400a may also include a banner 450a made of a durable plastic material wrapped about the kit to include labeling describing the kit and displaying the name brand of the product.

Figure 16A:
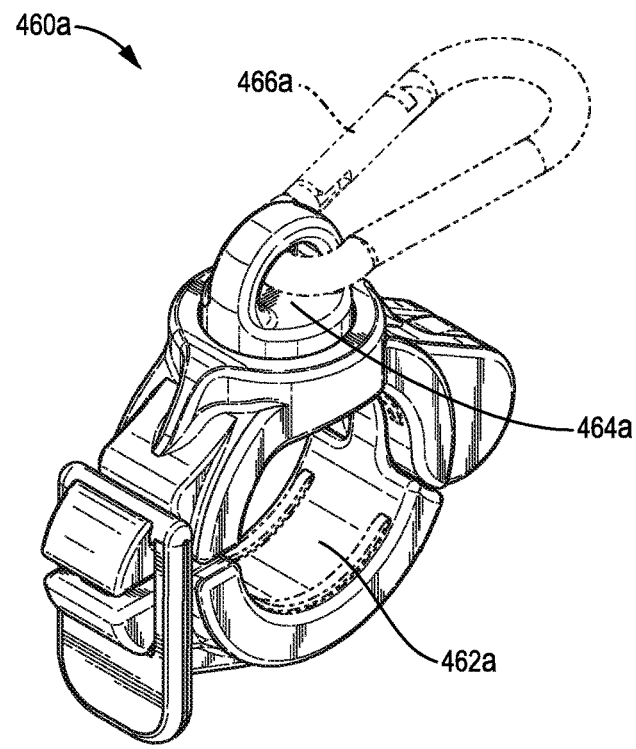
FIGS. 16A and 16B shows various components optionally used in the assemblies and kits incorporating swivel couplings and/or flexible tapered grip shown in FIGS. 12-15.

Kit 400a may further include a clamp assembly 460a which can be located at various positions along the lengths of the hoses/cable product to lift and secure the kit when the various assemblies are connected. Clamp assembly 460a is more clearly depicted in FIG. 16A to include clamp ring 462a which is affixed about the assemblies and the spiral wrap and a loop 464a through which a line 466a may be tied and fastened to a point on the vehicle or other system the kit is being mounted to elevate the assemblies as needed. Kit 400a may include a hangar (not shown) or vertical support (not shown) attached to clamp 460a to hold entire kit in place relative to connection points of the hose assemblies.

Figure 15B:
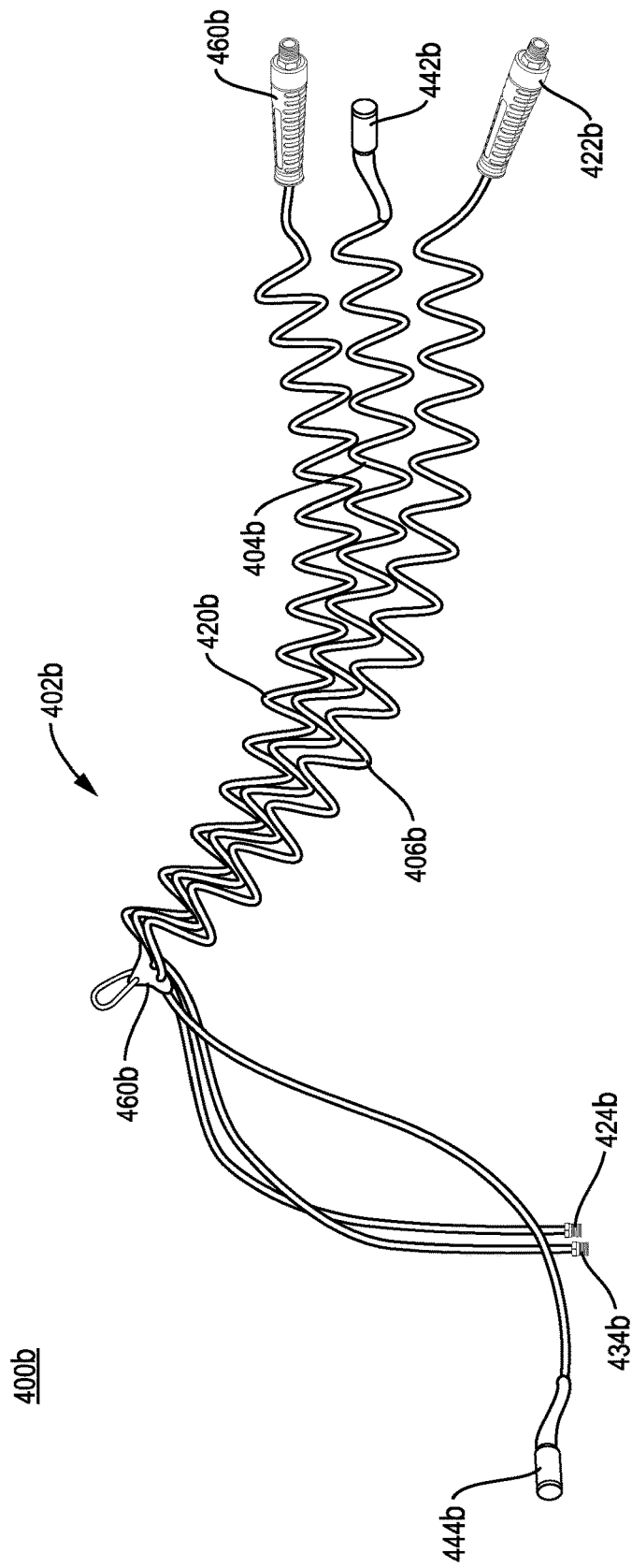

Similarly, there is shown in FIG. 15B, a kit 400b which includes two or more assemblies, such as assemblies 402b, 404b, and 406b required for a particular installation, wherein hose coil assembly 402b may be comprised of a hose 420b with a grip assembly 422b installed on one end and a swivel coupling 424b installed on the other end. Similarly, hose coil assembly 406b may be comprised of a hose 430b with a grip assembly 432b installed on one end and a swivel coupling 434b installed on the other end. The swivel coupling assemblies may be the same as swivel coupling assembly 100 or 100a described above. The grip assemblies may be the same as the flexible tapered grip assembly described herein with regard to FIGS. 1-7.

However, it should be noted that any suitable grip assembly could be used for grip assemblies. Assembly 404b may be an electrical power assembly and comprises cable 440b which has electrical connectors 442b and 444b disposed on either end of cable 440b.

Figure 16B:
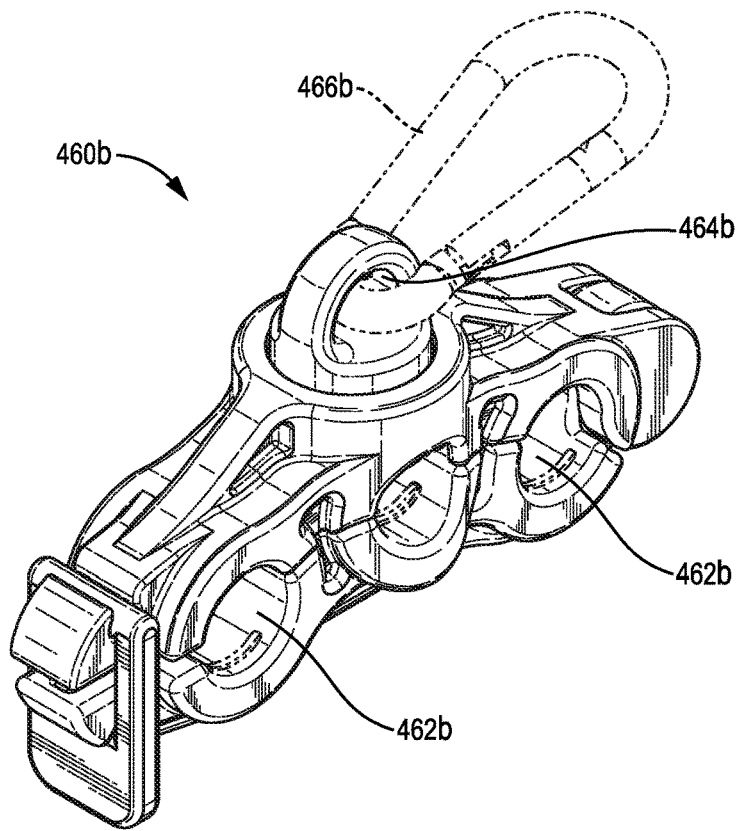

Kit 400b may further include a clamp assembly 460b which can be located at various positions along the lengths of the hoses/cable product to lift and secure the kit when the various assemblies are connected. Clamp assembly 460b is more clearly depicted in FIG. 16B to include clamp rings 462b which are affixed about assemblies 402b and 406b and a loop 464 through which a line 466 may be tied and fastened to a point on the vehicle or other system the kit is being mounted to elevate the assemblies as needed. Kit 400b may include a hangar (not shown) or vertical support (not shown) attached to clamp 460b to hold the entire kit in place relative to connection points of the hose assemblies.

While the foregoing description of the invention enables one of ordinary skill to make and use what is considered presently to be the best mode thereof, those of ordinary skill will understand and appreciate the existence of variations, combinations, and equivalents of the specific embodiments and examples herein.

The above-described embodiments of the present invention are intended to be examples only. Alterations, modifications and variations may be effected to the particular embodiments by those of skill in the art without departing from the scope of the invention, which is defined solely by the claims appended hereto.

The invention is therefore not limited by the above-described embodiments and examples, or embodiments and applications within the scope and spirit of the invention claimed as follows.

What is claimed is:

1. A grip and fitting assembly comprising:
   a grip having:
   a substantially tubular interior, a first end of which includes an interior seating surface,
   an annular lip perpendicular to said interior seating surface, and
   at least one keyway boss projecting from a sidewall of said substantially tubular interior and positioned about said annular lip and adjacent to said interior seating surface; and
   a fitting having a first coupling end, a second coupling end, a retaining shoulder located between said first coupling end and said second coupling end, and an exterior seating surface located between said retaining shoulder and said first coupling end, said retaining shoulder including at least one keyway recess suitably dimensioned to matingly correspond to said at least one keyway boss and a shoulder surface perpendicular to said exterior seating surface;

wherein said at least one keyway boss and said at least one keyway recess are configured to interlock upon abutment of said interior seating surface with said exterior seating surface so as to preclude rotational movement between said grip and said fitting and said annular lip and said shoulder surface are configured to snap fit against one another so as to preclude axial movement between said grip and said fitting in a first direction.

2. The assembly of claim 1, wherein said retaining shoulder has an outermost diameter greater than an innermost diameter of said interior seating surface.

3. The assembly of claim 2, wherein said retaining shoulder includes a ramped surface, adjacent said second coupling end, facilitating movement of said retaining shoulder across said interior seating surface.

4. The assembly of claim 3, wherein said shoulder surface is opposite said ramped surface.

5. The assembly of claim 1, wherein said first coupling end includes a threaded portion configured to accept a universal coupling mechanism.

6. The assembly of claim 5, wherein said universal coupling mechanism is a gladhand.

7. The assembly of claim 1, wherein the fitting further includes a nut member positioned between the threaded portion and the exterior surface configured to contact the first end of the grip upon abutment of said interior seating surface with said exterior seating surface so as to preclude axial movement between said grip and said fitting in a second direction, opposite the first direction.

8. The assembly of claim 1, wherein said second coupling end is barbed to accept a flexible conduit and wherein the second coupling end is located within the substantially tubular interior of the grip.

9. The assembly of claim 8, wherein said flexible conduit is a length of air hose.

10. The assembly of claim 1 including more than one said keyway boss and, correspondingly, more than one said keyway recess.

11. The assembly of claim 1 including a rail located at a second end of said grip opposite said first end, said rail being thickened.

12. The assembly of claim 11 wherein the grip is formed of a flexible material having a thickness which decreases from the first end of the grip to the rail.

13. A hose assembly, comprising:
a hose having a first end and a second end;
a swivel coupling affixed to the first end of the hose;
a grip and fitting assembly affixed to the second end of the hose;
wherein the grip and fitting assembly comprise:
a grip having:
a substantially tubular interior, a first end of which includes an interior seating surface,
an annular lip perpendicular to said interior seating surface, and
at least one keyway boss projecting from a sidewall of said substantially tubular interior and positioned about said annular lip and adjacent to said interior seating surface; and a fitting having a first coupling end, a second coupling end, a retaining shoulder located between said first coupling end and said second coupling end, and an exterior seating surface located between said retaining shoulder and said first coupling end, said retaining shoulder including at least one keyway recess suitably dimensioned to matingly correspond to said at least one keyway boss and a shoulder surface perpendicular to said exterior seating surface;

wherein said at least one keyway boss and said at least one keyway recess are configured to interlock upon abutment of said interior seating surface with said exterior seating surface so as to preclude rotational movement between said grip and said fitting and said annular lip and said shoulder surface are configured to snap fit against one another so as to preclude axial movement between said grip and said fitting in a first direction.

14. The assembly of claim 13, wherein said retaining shoulder has an outermost diameter greater than an innermost diameter of said interior seating surface.

15. The assembly of claim 14, wherein said retaining shoulder includes a ramped surface, adjacent said second coupling end, facilitating movement of said retaining shoulder across said interior seating surface.

16. The assembly of claim 15, wherein said shoulder surface is opposite said ramped surface.

17. The assembly of claim 13, wherein said first coupling end includes a threaded portion configured to accept a universal coupling mechanism.

18. The assembly of claim 17, wherein said universal coupling mechanism is a gladhand.

19. The assembly of claim 13, wherein the fitting further includes a nut member positioned between the threaded portion and the exterior surface configured to contact the first end of the grip upon abutment of said interior seating surface with said exterior seating surface so as to preclude axial movement between said grip and said fitting in a second direction, opposite the first direction.

20. The assembly of claim 13, wherein said second coupling end is barbed to accept the second end of the hose and wherein the second coupling end is located within the substantially tubular interior of the grip.

21. The assembly of claim 13 including more than one said keyway boss and, correspondingly, more than one said keyway recess.

22. The assembly of claim 13 including a rail located at a second end of said grip opposite said first end, said rail being thickened.

23. The assembly of claim 22 wherein the grip is formed of a flexible material having a thickness which decreases from the first end of the grip to the rail.

24. A kit having a plurality of hose assemblies, at least one of the hose assemblies, comprising:
a hose having a first end and a second end;
a swivel coupling affixed to the first end of the hose;
a grip and fitting assembly affixed to the second end of the hose; wherein the grip and fitting assembly, comprises:
a grip having:
a substantially tubular interior, a first end of which includes an interior seating surface,
an annular lip perpendicular to said interior seating surface, and
at least one keyway boss projecting from a sidewall of said substantially tubular interior and positioned about said annular lip and adjacent to said interior seating surface; and a fitting having a first coupling end, a second coupling end, a retaining shoulder located between said first coupling end and said second coupling end, and an exterior seating surface located between said retaining shoulder and said first coupling end, said retaining shoulder including at least one keyway recess suitably dimensioned to matingly correspond to said at least one keyway boss and a shoulder surface perpendicular to said exterior seating surface;

wherein said at least one keyway boss and said at least one keyway recess are configured to interlock upon abutment of said interior seating surface with said exterior seating surface so as to preclude rotational movement between said grip and said fitting and said annular lip and said shoulder surface are configured to snap fit against one another so as to preclude axial movement between said grip and said fitting in a first direction.

25. The kit of claim 24, wherein said retaining shoulder has an outermost diameter greater than an innermost diameter of said interior seating surface.

26. The kit of claim 25, wherein said retaining shoulder includes a ramped surface, adjacent said second coupling end, facilitating movement of said retaining shoulder across said interior seating surface.

27. The kit of claim 26, wherein said shoulder surface is opposite said ramped surface.

28. The kit of claim 24, wherein said first coupling end includes a threaded portion configured to accept a universal coupling mechanism.

29. The kit of claim 28, wherein said universal coupling mechanism is a gladhand.

30. The kit of claim 24, wherein the fitting further includes a nut member positioned between the threaded portion and the exterior surface configured to contact the first end of the grip upon abutment of said interior seating surface with said exterior seating surface so as to preclude axial movement between said grip and said fitting in a second direction, opposite the first direction.

31. The kit of claim 24, wherein said second coupling end is barbed to accept the second end of the hose and wherein the second coupling end is located within the substantially tubular interior of the grip.

32. The kit of claim 24 including more than one said keyway boss and, correspondingly, more than one said keyway recess.

33. The kit of claim 24 including a rail located at a second end of said grip opposite said first end, said rail being thickened.

34. The kit of claim 33 wherein the grip is formed of a flexible material having a thickness which decreases from the first end of the grip to the rail.

* * * * *